US009281131B2

(12) United States Patent
Jang et al.

(10) Patent No.: US 9,281,131 B2
(45) Date of Patent: Mar. 8, 2016

(54) ELECTROLYTE-COMPRISING POLYMER NANOFIBERS FABRICATED BY ELECTROSPINNING METHOD AND HIGH PERFORMANCE DYE-SENSITIZED SOLAR CELLS DEVICE USING SAME

(75) Inventors: Young-Wook Jang, Haeundae-gu Busan (KR); Mi-Ra Kim, Pusan (KR); Young-Keun Kim, Nam-gu Busan (KR); Sung-Il Jang, Dongnae-gu Busan (KR); Hyun-Woo Park, Sasang-gu Busan (KR); Du-Hyun Won, Namgu Busan (KR); Ji-Un Kim, Busan (KR); Jin-Kook Lee, Busan (KR); Sung-Hae Park, Changwon-si (KR)

(73) Assignee: SOLVAY SA, Brussels (BE)

( * ) Notice: Subject to any disclaimer, the term of this patent is extended or adjusted under 35 U.S.C. 154(b) by 687 days.

(21) Appl. No.: 13/061,062

(22) PCT Filed: Aug. 31, 2009

(86) PCT No.: PCT/KR2009/004889
§ 371 (c)(1),
(2), (4) Date: Jun. 1, 2011

(87) PCT Pub. No.: WO2010/024644
PCT Pub. Date: Mar. 4, 2010

(65) Prior Publication Data
US 2011/0220205 A1    Sep. 15, 2011

(30) Foreign Application Priority Data

Aug. 29, 2008    (KR) .................. 10-2008-0085340

(51) Int. Cl.
*H01L 31/00*    (2006.01)
*H01G 9/20*    (2006.01)

(52) U.S. Cl.
CPC ............ *H01G 9/2068* (2013.01); *H01G 9/209* (2013.01); *H01G 9/2031* (2013.01); *H01G 9/2086* (2013.01); *H01G 9/2059* (2013.01); *Y02E 10/542* (2013.01)

(58) Field of Classification Search
CPC ...... H01G 9/20; H01G 9/2022; H01G 9/2031; H01G 9/2036; H01G 9/204; H01G 9/209; H01G 9/2027
USPC .......................................................... 136/252
See application file for complete search history.

(56) References Cited

U.S. PATENT DOCUMENTS 6,756,537 B2    6/2004 Kang et al.
2003/0145885 A1*    8/2003 Kang et al. ................. 136/263
(Continued)

FOREIGN PATENT DOCUMENTS

EP    1528579 A2    5/2005
EP    2031613 A2    3/2009
(Continued)

OTHER PUBLICATIONS

Kim et al., "Dye-Sensitized Solar Cells based on Poly(vinylidene fluoride-hexafluoro propylene)/LiClO4 Nanofibers by Electrospinning Method," Photovoltaic Specialists Conference, 2008, PVSC '08, 33rd IEEE, May 11-16, 2008.*
(Continued)

*Primary Examiner* — Eli Mekhlin

(57) ABSTRACT

A polymer electrolyte including a polymer fiber having a nanoscale diameter, wherein the polymer fiber is fabricated by an electrospinning method and a solar cell device exhibiting high energy conversion efficiency using the same. The solid-state electrolyte comprising such nanosized polymer fiber does not need a sealing agent and further simplifies the entire process compared to a conventional dye-sensitized solar cell using liquid electrolytes. Specifically, the energy conversion efficiency of the present dye-sensitized solar cell is significantly superior to that of a dye-sensitized solar cell using a polymer film electrolyte fabricated by a spin coating method. Further, the present dye-sensitized solar cell device can be obtained by using a scattering layer and compensating the surface effect.

18 Claims, 18 Drawing Sheets

(56) References Cited

U.S. PATENT DOCUMENTS

| | | |
|---|---|---|
| 2005/0067009 A1 | 3/2005 | Lee et al. |
| 2005/0092359 A1 | 5/2005 | Uchida et al. |
| 2005/0109385 A1 | 5/2005 | Kim et al. |
| 2005/0126629 A1* | 6/2005 | Okada et al. ............ 136/263 |
| 2005/0194040 A1* | 9/2005 | Hirose ....................... 136/263 |
| 2005/0260786 A1 | 11/2005 | Yoshikawa et al. |
| 2005/0263182 A1 | 12/2005 | Morooka et al. |
| 2005/0279402 A1 | 12/2005 | Ahn et al. |
| 2006/0185714 A1 | 8/2006 | Nam et al. |
| 2006/0219294 A1 | 10/2006 | Yabuuchi et al. |
| 2007/0062576 A1* | 3/2007 | Duerr et al. ............... 136/263 |
| 2007/0085051 A1 | 4/2007 | Sohn et al. |
| 2008/0072960 A1* | 3/2008 | Kim et al. ................. 136/263 |
| 2008/0078443 A1 | 4/2008 | Jun et al. |
| 2008/0185037 A1 | 8/2008 | Kim et al. |
| 2008/0202583 A1 | 8/2008 | Lee et al. |
| 2009/0025793 A1 | 1/2009 | Kim et al. |
| 2009/0056808 A1 | 3/2009 | Jo et al. |
| 2010/0012166 A1* | 1/2010 | Yamanaka et al. ........ 136/244 |

FOREIGN PATENT DOCUMENTS

| | | |
|---|---|---|
| EP | 2045868 A1 | 4/2009 |
| JP | 20060331791 A | 12/2006 |
| JP | 20080091162 A | 4/2008 |
| JP | 20080186669 A | 8/2008 |
| JP | 20060236807 A | 9/2009 |
| KR | 20030065957 A | 8/2003 |
| KR | 20070019868 A | 2/2007 |
| KR | 830946 B1 | 5/2008 |
| KR | 20080038651 A | 5/2008 |
| KR | 20090012595 A | 2/2009 |
| KR | 898280 B1 | 5/2009 |
| WO | WO 03085774 A1 | 10/2003 |
| WO | WO 2007083461 A1 | 7/2007 |

OTHER PUBLICATIONS

Kim, Hooi-Sung, et al—"Effect of Electrolyte in Electrospun PEO/ToiO2 Composite fibers"—Mol. Cryst. Liq. Cryst., 2007, pp. 464, 65/[647]-71/[653]; 8 pgs.

Hore, Sarmimala, et al—"Influence of scattering layers on efficiency of dye-sensitized solar cells"—Solar Energy Materials & Solar Cells, 2006, 90, pp. 1176-1188; 13 pgs.

Park, S.H., et al—"Dye-Sensitized Solar Cells using Polymer Electrolytes based Poly(vinylidene fluoride-hexafluoro propylene) Nanofibers Electrospinning Method"—J Nanosci Nanotechnol, 2008, Sep. 8(9), pp. 4889-4894; 6 pgs; Abstract included in English.

Lee, Jin-Kook, et al—"Multi-layered TiO2 nanostructured films for dye-sensitized solar cells"—J Mater Sci : Mater Electron, 2009, 20, pp. S446-S450, 5 pgs.

* cited by examiner (A)

(B)

(A)

(B)

(A)  (B)  (C)

(A)  (B)  (C)

A            A-1

B            B-1

C            C-1

D            D-1

E

ELECTROLYTE-COMPRISING POLYMER NANOFIBERS FABRICATED BY ELECTROSPINNING METHOD AND HIGH PERFORMANCE DYE-SENSITIZED SOLAR CELLS DEVICE USING SAME

CROSS-REFERENCE TO RELATED APPLICATIONS

This application is a U.S. national stage entry under 35 U.S.C. §371 of International Application No. PCT/KR2009/004889 filed Aug. 31, 2009, which claims priority to Korean Application No. KR 10-2008-0085340 filed Aug. 29, 2008, this application being herein incorporated by reference in its entirety for all purposes.

TECHNICAL FIELD

The present invention relates to a solar cell device, and more particularly to a polymer electrolyte including a polymer fiber having a nanoscale diameter wherein the polymer fiber is fabricated by electrospinning PVDF-HFP polymers. The present invention also relates to a high performance dye-sensitized solar cell device using the same.

BACKGROUND OF THE INVENTION

There are problems in the environment such as global warming due to the continuous use of fossil fuel. Moreover, the use of uranium causes problems such as radioactive contamination as well as the need for facilities for disposing radio active waste. Accordingly, there is a strong demand for alternative energy and various researches thereon have been conducted. One representative type of alternative energy is solar energy.

A solar cell device is a device, which directly produces electricity by using an optical absorbing material generating an electron and hole when a light is irradiated. In 1839, a French physicist by the name of Becquerel first discovered the photoelectron-motive force wherein a chemical reaction induced by light generates a current. A similar phenomenon was also discovered in the case of solids such as selenium. Thereafter, numerous researches on solar cell were continuously carried out in relation to inorganic silicone. This is because a silicone based solar cell with about 6% efficiency was developed for the first time in the Bell Research Center in 1954.

Such inorganic solar cell device consists of the p-n junction of inorganic semiconductor such as silicone. Silicone used for solar cells can be classified into crystalline silicone such as single crystalline or poly-crystalline silicone and amorphous silicone. The crystalline silicone has a better energy conversion efficiency compared to amorphous silicone when the solar energy is conversed into electrical energy. However, it has inferior productivity due to time and energy used for growing the crystalline. Amorphous silicone has a superior optical absorption, allows easy enlargement and has good productivity compared to crystalline silicone. But, it is inefficient in terms of facilities since, for example, vacuum processors are required, etc. Particularly, in case of the inorganic solar cell devices, there are problems since it is difficult to process and mold them. This is because the manufacturing cost is high and the device is manufactured in the vacuum condition.

Due to such problems, various researches on the solar cell device using the photovoltaic phenomenon of organic material (instead of silicone) have been attempted. The photovoltaic phenomenon of organic material refers to a phenomenon wherein when the light is irradiated on the organic material, the organic material absorbs photons to generate electron-hole pairs, said pairs being separated from each other and transferred to anode and cathode, respectively, in which the current is then generated by such flow of the electric charge. In other words, typically in organic solar cells, when the light is irradiated on the junction of the electron donor and electron acceptor material, the electron-hole pairs are formed in the electron donor and the electrons are transferred to the electron acceptor to produce separation of the electron-hole. Such a process is referred to as "excitation of the charge carrier by light" or "photoinduced charge transfer (PICT)" and carriers generated by light are separated into electron-hole and produce electrical power through the outer circuit.

When considering the fundamentals of physics, the output power, which is produced in all solar power generations including the solar cells, is regarded as a product resulting from the flow of photoinduced exiton generated by the light and driving force. In the solar cells, the flow is related to the current and the driving force is directly related to the voltage. Generally, the voltage of solar cells is determined by the used electrode material, the solar energy conversion efficiency is the value obtained by dividing the output voltage into the input solar energy, and the total output current is determined by the number of absorbed photons.

The organic solar cells that are prepared by using the optic pumping phenomenon of organic materials as described above, can be classified into the multi-layer solar cell device, which introduces the electron donor and electron acceptor layers between the transparent electrode and metal electrode, and the sing-layer solar cell introducing the blend of the electron donor and electron acceptor.

However, the solar cells using the typical organic material have problems in terms of energy conversion efficiency and durability. In this respect, the Gratzel (Gr) research team in Switzerland developed a dye-sensitized solar cell, which is a photoelectrochemical solar cell, by using dye as a photo sensitizer in 1991. The photoelectrochemical solar cell suggested by Gratzel, et al. uses an oxide semiconductor comprising the titanium dioxide of nano particles and photosensitive dye molecules. In other words, the dye-sensitized solar cell is a solar cell prepared by introducing electrolyte into the inorganic oxide layer such as titanium oxide wherein the dye is absorbed between the transparent electrode and metal electrode, and undergoing a photoelectrochemical reaction. Generally, the dye-sensitized solar cell includes two types of electrodes (photoelectrode and opposing electrode), inorganic oxide, dye and electrolyte. The dye-sensitized solar cell is environmentally friendly since it uses environmentally harmless material and has a high energy conversion efficiency of about 10%, which is second only to that of amorphous silicone solar cell of the existing inorganic solar cells. Further, its manufacturing cost is about 20% of that of the silicone solar cell. Thus, its high possibility for commercialization was reported.

The dye-sensitized solar cell, which is manufactured by using the photochemical reaction as described above, is a multi-layer cell device wherein the inorganic oxide layer in which dye absorbing the light are absorbed between the cathode and anode, and wherein the electrolyte layer that reduces electrons are introduced. The conventional dye sensitive solar cell device is briefly described below.

The dye-sensitized solar cell of the conventional multi-layered type can include, for example, the titanium oxide layer/electrolyte/electrode in which the substrate/electrode/dye is absorbed. More specifically, the lower substrate, anode, titanium oxide layer in which dye is absorbed, electrolyte layer, cathode and upper substrate are successively laminated from the lower layer. At this time, the upper and lower substrates are generally prepared with glass or plastic, the anode is coated with ITO (indium-tin oxide) or FTO (fluorine doped tin oxide), and the cathode is coated with platinum.

In view of the operating principles of the conventional dye sensitive solar cell device as constituted above, the dye absorbs the photons (electron-hole pairs) to form excitons. The excitons are transferred from the ground state to the excited state when the light is irradiated on the titanium oxide layer on which the dye is absorbed. As such, the election-hole pairs are separated from each other, the electrons are injected into the titanium oxide layer, and the holes are transferred to the electrolyte layer. If the external circuit is set up according to the above, then the electrons move from the anode to the cathode via the titanium oxide layer through the conducting wire to generate a current. The electrons in the cathode are reduced by the electrolyte and the excited electrons are continuously transferred to the generated current.

However, the general dye-sensitized solar cell devices have a high energy conversion efficiency, while suffering from safety problems such as the degradation of property due to the evaporation of solution, leakage of electrolytes, etc. Such problems constitute a great barrier of commercialization. Various researches have been carried out to prevent such leakage of electrolytes. Especially, the dye-sensitized solar cells using the semi-solid or solid electrolytes have been developed to enhance the stability and durability of the solar cells.

For example, Laid-Open Publication No. KR2003-65957 discloses a dye-sensitized solar cell including polyvinylidene fluoride dissolved in a solvent such as N-methyl-2-pyrrolidone or 3-methoxypropionitrile. The gel-type polymer electrolyte prepared by such method has a high ion conductance at room temperature, which is similar to the liquid electrolyte, but makes the preparation process of cells difficult since it has an inferior mechanical property and also has a lower liquid retaining property of polymer electrolyte.

Researches using electrospinning as a technique for preparing such polymer electrolyte membrane are vigorously carried out. Electrospinning was filed as a patent application by Formhals (an engineer in Germany) in 1934. The scientific basis for electrospinning was developed from the idea of Raleigh in 1882 that the electrostatic force can overcome the surface tension of liquid when the liquid falls down. The polymer fiber prepared by electrospinning is included in the ultra-fine nanotechnology and its worldwide market scale approaches about one trillion dollars in 2100. Generally, the nanofiber is defined as a fiber having a diameter of 20 nm to 1 µm and prepared by electro spinning, which spins the polymer in a low viscosity state as a fiber for a split second by the electrostatic force. Mass production is capable so as to have applications such as nano particles and filters, electrolytes for fuel cells, medical applications, etc. Its applications are expected to continuously grow.

The greatest advantage of nanofibers is that they have larger surface areas compared to conventional fibers. Such an advantage allows a nanofiber to be used as an effective material for a filter. Electrospun nanofiber can be also used for a protective clothing, an antibiotic wound dressing, drug delivery material, etc. However, such nanofiber can be prepared only by an electrospinning method and the fiber is formed irregularly. Thus, it is difficult to control the formation of the fiber. To overcome such problems, a method is considered, which gathers the electric field at one side by making the end of the rotating focusing plate to be sharp. Also, another method is considered that arranges the nanofiber in a direction during processes by using an interspacing focusing plate. The mutual interspacing is formed by an electric field near the focusing plate and electrostatic charge of the fiber. Thus, the produced fiber is prepared. Recently, nanofiber has been deemed as a biomedical implantable material since it has high porosity and large surface area. Accordingly, such characteristics can be helpful to adhesion, growth, proliferation of cells, etc. However, nanofiber fabricated by electrospinning has an inferior physical property since the improvement of strength can be barely obtained by molecular arrangement of the polymer itself. To overcome such problems, various process parameters are used in many researches directed to the preparation of nanofibers.

Reneker of the Akron University announced the nanofiber preparation of various polymer materials and the method of modulating influence factors by the electrospinning method. Further, Drexel University has prepared a nano composite material having improved mechanical properties by complementing carbon nanotube by the electrospinning method. Deitzel announced that as the concentration of polymers increases, the diameter of nanofiber and the diameter of fiber tend to increase by increasing the polymer concentration according to the power law relation. Doshi and Reneker announced that if the surface tension of polymer solution becomes smaller, then the bead in fiber can be reduced.

The researches on electrospinning process and the product development related to biological application and the polymer material, which is subjected to electrospinning, have been continuously carried out. The Commonwealth University brought success to the technology in which the nano-sized fine cellulose originally existing in the blood is fabricated to generate the flannel shape of bandage by using the electrospinning technology. Ethicon Inc. prepared a suture (PDS) in the form of mono-filament of PDO using p-dioxanon as a raw material. Woodward, et al. (1985) suggested that thermal treatment is required since the degree of crystallinity of the non-woven fabric prepared by electrospinning is remarkably inferior to that of the polymer before electrospinning Ignatious demonstrated that the medication can be instantaneously administered at any time by using the nanofiber, which was subjected to electrospinning MIT Material Processing Center performed a research on the scaffold for artificial organs and the University of Harvard conducted a research on the nanofiber using non-tissues. Rutledge at MIT ISN (Institute for Soldier Nanotechnologies) has manufactured the PCL scaffold by using the PCL nanofiber having a size of 0.5-10 µm and being subjected to electrospinning, and developed a nanofiber for treating damaged articular cartilages. Yarin (2004) of Israel suggested a new method wherein the polymer solution is put at a lower part and then subjected to spinning to the upper side by using the ferromagnetic suspension system instead of the conventional spinning method.

Researches directed to nanofiber manufacturing by using electrospinning were conducted by various national universities and research institutes. However, they are mostly dependeded on experiments, and the main topics of researches have been the characteristics and morphology of nanofibers as observed in the experiments when modifying the process parameters.

In case of the solar battery using solid electrolyte, the solvent is removed from the electrolyte solution to compensate for the reduced efficiency by the solvent. Then, the electrons, which are entered through the anode electrode, are easily reduced by using the hole conductor material in solid phase, wherein the dye is oxidized to flow the current.

A research relating to the solar cell using the solid polymer electrolyte without solvents was first attempted by the De Paoli group of Brazil in 2001. This group prepared a polymer electrolyte comprising poly(epichlorohydrin-co-ethylene oxide)/NaI/$I_2$, and it is reported that it has about 1.6% of energy conversion efficiency at 100 mW/cm². Thereafter, the Flaras group conducted a research in 2002 for improving the mobility of $I^-/I_3^-$ by adding titanium oxide nanoparticles to polyethylene oxide with high crystallinity to decrease the crystallinity of polymer. The Center for Facilitated Transport Membrane of KIST conducted a research for effectively applying the low molecular weight polyethyleneglycol (PEG) to the dye-sensitized solar cell using a hydrogen bond in 2004 and reported that the resulting energy conversion efficiency is about 3.5%.

Recently, the Flavia Nogueira group manufactured a solid dye-sensitized solar cell in the form of $TiO_2$ nanotube by using poly(ethylene oxide-co-epichlorohydrin), which was synthesized with ethylene oxide and epichlorohydrin at the ratio of 84:16 as a polymer electrolyte, and reported the energy conversion efficiency of 4.03% in 2007.

There still exists a strong need in the art to develop solid dye-sensitized solar cell devices to overcome the problems described above without reducing the ion conductivity and damaging the solid form.

DETAILED DESCRIPTION OF THE INVENTION

Objective of the Invention

The present invention is adapted to overcome the conventional problems described above. As one objective of the present invention, electrospun nanoscale polymer fibers are added to the electrolytes of polymer film electrolytes to produce a high performance dye-sensitized solar cell.

Another objective of the present invention is to provide a high performance dye-sensitized solar cell prepared by using the polymer nanofibers having high specific surface area in preparing the electrolyte layer to efficiently induce an increase of photocurrents in the dye-sensitized solar cell. The present invention is also directed to a method of preparing the above.

Yet another objective of the present invention is to provide a dye-sensitized solar cell, which has enhanced photocurrent by introducing a functionalized layer preventing a reverse current from the inorganic oxide layer, and a method of preparing the same.

Still yet another objective of the present invention is to provide a dye-sensitized solar cell, which has enhanced photocurrent by introducing a light scattering layer on the top of the inorganic layer so that the light passed through the inorganic oxide layer is subjected to the light scattering effect. This is so that a large amount of light can be absorbed. The present invention is also directed to a method of preparing the above.

Technical Problems to be Solved

To achieve the above objectives, the present invention provides dye-sensitized solar cells, comprising:
a first substrate and a second substrate that are arranged to face each other;
a first electrode interposed between the first and second substrates, wherein the first electrode comprises an inorganic oxide layer and a dye layer chemically absorbed into the inorganic oxide layer to provide excited electrons;
a second electrode that is disposed opposite to the first electrode, wherein the second electrode is interposed between the first and second substrates, thereby allowing an electric current to flow;
a first interface bonding layer that facilitates the interface bonding to the inorganic oxide layer on the top of the inorganic oxide layer;
a second interface bonding layer that prevents an inverse current on the top of the first interface bonding layer;
a light scattering layer interposed between the first and second interface bonding layers, wherein said light scattering layer increases an optical absorption; and
solid electrolytes interposed between the first and second electrodes, wherein the solid electrolytes comprise polymer nanofibers fabricated by an electrospinning method and can provide electrons to the dye layer by an oxidation-reduction reaction.

To achieve the above objectives, the present invention provides a process of preparing dye-sensitized solar cells, comprising:
preparing a first substrate;
forming an inorganic oxide layer on one surface of the first substrate and forming a first electrode;
forming a first interface bonding layer that facilitates the interface bonding to the inorganic oxide layer on the top of the inorganic oxide layer;
forming a light scattering layer on the top of the first interface bonding layer to increase light absorption;
forming a second interface bonding layer on the top of the light scattering layer to prevent an inverse current;
absorbing a dye layer on the top of the second interface bonding layer;
forming polymer nanofibers fabricated by electrospinning a polymer solution with an electrospinning device on the top of the second interface bonding layer to which the dye layer is absorbed, applying an electrolyte solution to the polymeric nanofibers and then evaporating the applied solution to form solid electrolytes; and
forming a second electrode and a second substrate on the top of the solid electrolytes.

Effects of the Invention

When the conventional liquid electrolyte and semi-solid electrolyte are used in a dye-sensitized solar cell, there exist leakage problems, long-term stability problems and problems induced by contact between an electrode and a counter electrode by the evaporation of electrolytes.

The present invention is adapted to overcome such problems by introducing the polymer nanofiber into the electrolyte layer. As shown in the working example, a dye-sensitized solar cell is prepared by using such principle so that the above problems can be overcome by preparing the polymer nanofiber in various conditions.

The reverse current, which appears primarily on the interface of the inorganic oxide layer and electrolyte layer, can be also prevented by introducing an interface bonding layer. The amount of photocurrent is increased by introducing a light scattering layer to make reabsorption of the light easy. Further, the advantages obtained by introducing the nanoscale polymer fiber into the electrolyte layer are as follows.

First, the polymer nanofiber has a high specific surface area and a plurality of pores so that it can effectively contain and inject ions of the electrolyte. Thus, a better short circuit current and photovoltaic efficiency can be provided compared to a polymer film prepared by the spin-coating method.

Second, the polymer nanofiber prevents a short circuit by the contact of an working electrode and a counter electrode by the leakage of liquid electrolyte in the dye-sensitized solar cell using liquid electrolyte. Accordingly, it can resolve a long-term stability problem in the conventional liquid or semi-solid dye-sensitized solar cell. Thus, durability can be maintained Third, a reverse current is prevented by a functional layer and a light scattering layer introduced over the inorganic oxide layer. The penetrated light can be reabsorbed in the light scattering layer to increase photocurrents. Thus, the overall efficiency of the dye-sensitized solar cell can be improved.

Lastly, the electrospun polymer nanofiber has a superior photovoltaic efficiency compared to the conventional polymer film. This demonstrates the possibility of developing the solid type dye-sensitized solar cell.

Figure 30:
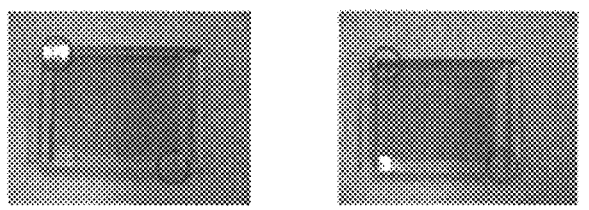
FIG. 30 is an image of an electrolyte durability test, which uses PVDF-HFP fibers having nanoscale diameter and prepared by the working examples of the present invention.
Figure 30:
Figure 30:
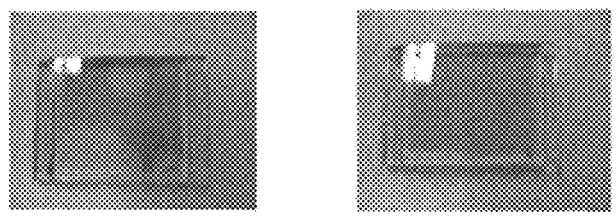
Figure 30:
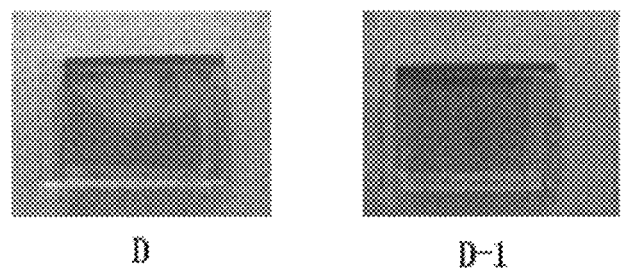
Figure 30:
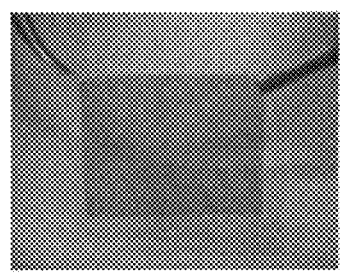

A in FIG. 30 is an image at 0 hr after the glass substrates are bonded and then only the electrolytes are introduced.

A-1 in FIG. 30 is an image at 0 hr after the fibers are introduced and the glass substrates are bonded wherein the electrolytes are then introduced.

B in FIG. 30 is an image at 12 hrs after the glass substrates are bonded and then only the electrolytes are introduced.

B-1 in FIG. 30 is an image at 12 hrs after the fibers are introduced and the glass substrates are bonded, wherein the electrolytes are then introduced.

C in FIG. 30 is an image at 36 hrs after the glass substrates are bonded and then only the electrolytes are introduced.

C-1 in FIG. 30 is an image at 36 hrs after the fibers are introduced and the glass substrates are bonded, wherein the electrolytes are then introduced.

D in FIG. 30 is an image at 48 hrs after the glass substrates are bonded and then only the electrolytes are introduced.

D-1 in FIG. 30 is an image at 48 hrs after the fibers are introduced and the glass substrates are bonded, wherein the electrolytes are then introduced.

E in FIG. 30 is an image in which the fibers are retained after the glass substrates of FIG. 35 D-1 are removed.

Figure 31:
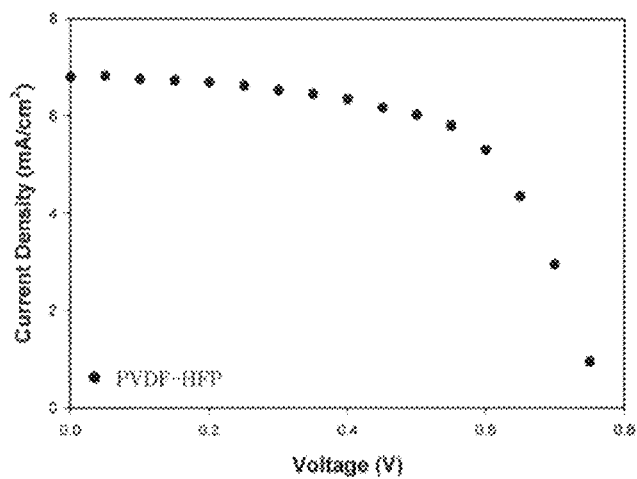

FIG. 31 is a graph of voltage-current density of the dye-sensitized solar cell device, which uses spin coated PVDF-HFP films according to comparative example 1.

Figure 32:
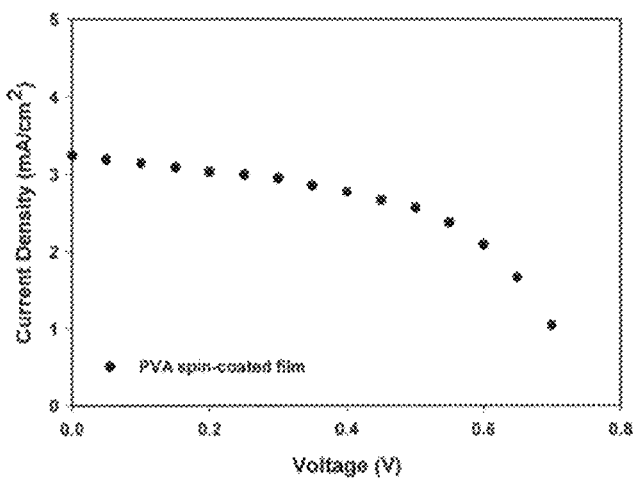

FIG. 32 is a graph of voltage-current density of the dye-sensitized solar cell device, which uses spin coated PVA films according to comparative example 2.

Figure 33:
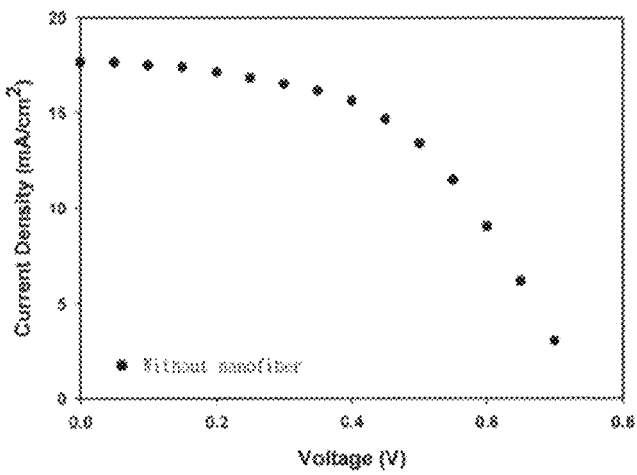

FIG. 33 is a graph of voltage-current density of the dye-sensitized solar cell device prepared by adding only electrolytes without fibers according to comparative example 3.

DESCRIPTION OF THE DENOTATION OF THE FIGURES

| | |
|---|---|
| 1001: first substrate | 1002: first electrode |
| 1003: inorganic oxide layer | 1004: interface bonding layer I |
| 1005: light scattering layer | 1006: interface bonding layer II |
| 1007: dye layer | 1008: polymer electrolyte layer |
| 1009: second electrode | 1010: second substrate |
| 2001: voltage supplier | 2002: solution transporter |
| 2003: electrospinner | 2004: collector |

Best Mode For Working The Invention

General liquid dye-sensitized solar cell devices having electrolytes containing solvent, not polymer, have problems with leakage of electrolytes and long-term stability. Also, a contact between a first electrode and a second electrode resulting therefrom reduces the life of the devices. Further, in the case of solid dye-sensitized solar cell devices incorporating polymer electrolytes, polymers are in the state of being randomly mixed. As such, the inventors of the present invention have prepared a dye-sensitized solar cell device, which can resolve the above problems by fabricating polymer nanofibers by electrospinning polymers and then incorporating the nanofibers into electrolytes.

The present invention provides electrolyte films for dye-sensitized solar cells comprising nanofibers made by electrospinning a specific chemical substance.

Figure 1:
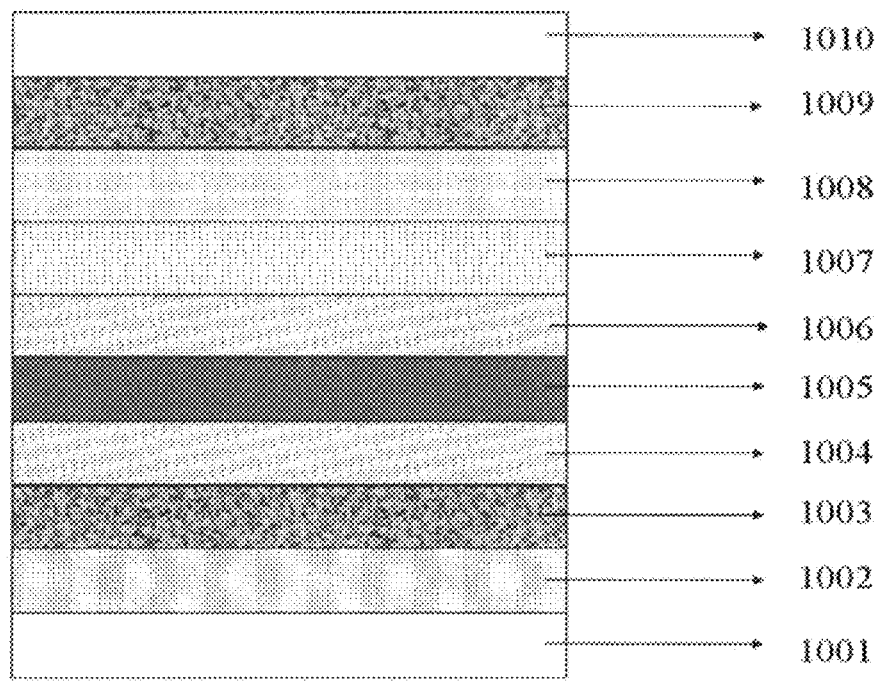
FIG. 1 is a cross-sectional view of the structure of the dye-sensitized solar cell devices prepared according to the present invention.

FIG. 1 is a cross-sectional view of a dye-sensitized solar cell device, which is prepared according to preferred embodiments of the present invention by adopting electrolytes incorporating electrospun nanofibers. As illustrated in FIG. 1, the dye-sensitized solar cell device prepared according to preferred embodiments of the present invention is in the form of a multi-layered thin film, which comprises: a first electrode (1002) and a second electrode (1009) that are opposite to each other and interposed between two transparent substrates, a first substrate (1001) and a second substrate (1010); and an inorganic oxide layer (1003), interface bonding layers I and II (1004 and 1006), a scattering layer (1005), a dye layer (1007) and a polymer electrolyte layer (1008) interposed between the first electrode (1002) and the second electrode (1009).

Said first substrate (1001) can be made of transparent materials such as glass or plastics including, e.g., PET (polyethylene terephthalate), PEN (polyethylene naphthelate), PP (polypropylene), PI (polyamide), TAC (tri acetyl cellulose) and the like. It is preferably made of glass.

Said first electrode (1002) is an electrode formed on one side of said first substrate (1001) by a transparent material. Said first electrode (1002) works as an anode. For said first electrode (1002), any material that has a lower work function than said second electrode (1005), transparency and conductivity can be used. In the present invention, said first electrode (1002) can be applied to or film-coated on the back side of said first substrate (1001) by using a sputtering or spin coating method.

Substances that can be used as the first electrode (1002) include any of ITO (indium-tin oxide), FTO (Fluorine doped tin oxide), ZnO—($Ga_2O_3$ or $Al_2O_3$), $SnO_2$—$Sb_2O_3$, etc. Most preferably, ITO or FTO is used.

Inorganic oxide layer (1003) is preferably a transition metal oxide in the form of nanoparticles, which includes transition metal oxides such as titanium oxide, scandium oxide, vanadium oxide, zinc oxide, gallium oxide, yttrium oxide, zirconium oxide, niobium oxide, molybdenum oxide, indium oxide, stannum oxide, lanthan group oxides, tungsten oxide, and iridium oxide; alkaline-earth metal oxides such as magnesium oxide and strontium oxide; and aluminium oxides, etc. Above all, titanium oxide in the form of nanoparticles is most preferred.

Inorganic oxide layer (1003) is applied to the first electrode (1002) by heat treatment followed by coating treatment on one side of said first electrode (1002). Generally, a doctor blade method or a screen print method is used for coating a paste comprising inorganic oxides on the back side of the first electrode (1002) with a thickness of about 5 to 30 μm, preferably 10 to 15 μm. A spin coating method, a spray method and a wet coating method can also be used.

On top of the inorganic oxide layer (1003) constituting a dye-sensitized solar cell device according to the present invention, a function layer having a number of functions may be introduced prior to absorption of dyes. On top of the inorganic oxide layer (1003), a first interface bonding layer (1004) aimed at easy interface bonding can be formed before introduction of a light scattering layer (1005).

The surface of the first interface bonding layer (1004) should have preferably uniformly distributed nanoparticles and high smoothness, as well as a more elaborate structure than that of the inorganic oxide layer (1003). The interface bonding layer I can be formed by any known methods that are conventionally used in the art. However, in general, a spin coating method or a dipping method is used for coating a paste comprising inorganic oxides on the back side of the inorganic oxide layer (1003) with a thickness of about 2-100 nm, preferably about 10-100 nm, and more preferably 30-50 nm. Alternatively, heat treatment is conducted after using a spin coating method, a spray method or a wet coating method. These layers generally include at least inorganic oxides, preferably transition metal oxides, alkali metal oxides or alkaline earth metal oxides, and more preferably semiconductor oxides. The constitutional elements of said interface bonding layer I may be the same or different from those of inorganic oxide layer (1003). The interface bonding layer I includes, for example, transition metal oxides such as titanium oxide, scandium oxide, vanadium oxide, zinc oxide, gallium oxide, yttrium oxide, zirconium oxide, niobium oxide, molybdenum oxide, indium oxide, stannum oxide, lanthan group oxides, tungsten oxide and iridium oxide; alkaline-earth metal oxides such as calcium oxide, magnesium oxide and strontium oxide; aluminium oxide, sodium oxide, cerium oxide, nickel oxide, sodium titanate, potassium niobate, barium titanate, strontium titanate, and a mixture of at least two of said oxides. In a specific embodiment, the interface bonding layer I is formed of either constitutional elements of inorganic oxide layer (1003) or a compound comprising the constitutional elements of inorganic oxide layer (1003). For example, the interface bonding layer I can be formed of at least one of titanium oxide, tungsten oxide and titanium-tungsten mixed oxide. More preferably, titanium oxide is used because it has the most preferred HOMO (highest occupied molecular orbital) and LUMO (lowest unoccupied molecular orbital) values for electron transfer.

In a preferred embodiment, the interface bonding layer I is formed from inorganic oxides in the form of nanoparticles, wherein the particles have an average diameter of 1 to 50 nm, preferably 2 to 30 nm, more preferably 5 to 20 nm. If the average particle diameter is less than 1 nm, then the agglomeration phenomenon occurs between the particles so that it is difficult to prepare a thin film having a uniform thickness. Rather, an increased resistance within the interface bonding layer leads to a decrease in Fill Factor (FF). On the contrary, if the average particle diameter is greater than 50 nm, then the thickness and porosity rate of the interface bonding layer increase and thus the amount of electrons lost during electron transfer increases, thereby leading to a decrease in photocurrent values and FF. The average particle diameter in the present invention refers to an average value of diameters of 500 particles as measured through scanning microscopic images.

On top of the introduced first interface bonding layer (1004), a light scattering layer (1005), which plays a role in increasing the absorption amount of light, is introduced. These layers generally include at least inorganic oxides, preferably transition metal oxides, alkali metal oxides, or alkaline earth metal oxides, and more preferably semiconductor oxides. The constitutional elements of said light scattering layer may be the same or different from those of inorganic oxide layer (1003) or interface bonding layer. The light scattering layer includes, for example, transition metal oxides such as titanium oxide, scandium oxide, vanadium oxide, zinc oxide, gallium oxide, yttrium oxide, zirconium oxide, niobium oxide, molybdenum oxide, indium oxide, stannum oxide, lanthan group oxides, tungsten oxide iridium oxide; alkaline-earth metal oxides such as calcium oxide, magnesium oxide, strontium oxide; aluminium oxide, sodium oxide, cerium oxide, nickel oxide, sodium titanate, potassium niobate, barium titanate, strontium titanate, and a mixture of at least two of said oxides. In a specific embodiment, the light scattering layer is formed of either constitutional elements of inorganic oxide layer (1003) or a compound comprising the constitutional elements of inorganic oxide layer (1003). For example, the light scattering layer can be formed of at least one of titanium oxide, tungsten oxide and titanium-tungsten mixed oxide. More preferably, titanium oxide is used because it has the most preferred HOMO and LUMO values for electron transfer.

In a preferred embodiment, the light scattering layer is formed from inorganic oxides in the form of fine particles, wherein the particles have an average diameter of 20 nm to 1 μm, preferably 50 to 600 nm, more preferably 100 to 500 nm. If the average particle diameter is less than 20 nm, then the most light is transmitted so that a desired light scattering effect cannot be obtained. On the contrary, if the average particle diameter is greater than 1 μm, then the thickness and porosity rate of the layer increase and thus the amount of electrons lost during electron transfer increases, thereby leading to a decrease in photocurrent values and FF to result in low efficiency. Further, an increase in particle size of the inorganic oxides diminishes transmittancy. Accordingly, the dye-sensitized solar cell device prepared as such is made opaque and its application is limited. The light scattering layer can be formed by any known methods that are conventionally used in the art. However, in general, a doctor blade method or a screen print method is used for coating a paste comprising inorganic oxides on the back side of the inorganic oxide layer (1003) to which the first interface bonding layer (1004) is applied with a thickness of about 500 nm-50 μm, preferably about 1-30 μm, more preferably 3-25 μm, and most preferably 5-20 μm. Alternatively, heat treatment is conducted after using a spin coating method, a spray method, a dipping method or a wet coating method.

On the top of the light scattering layer (1005) introduced is a second interface bonding layer (1006) for prevention of an inverse current. The second interface bonding layer can be formed in the same manner as the first interface bonding layer (1004). In the preferred embodiment, the two interface bonding layers share the same components, particle size, etc.

The inverse current often occurs in the course of transporting electrons in dye-sensitized solar cells. First, it may occur when the electrons transported from the dye layer to the inorganic oxide layer fail to be transported to a transparent electrode but are reversely transported to the electrolyte layer, by which the amount of electrons collected in a transparent electrode decreases. This is mainly due to the direct contact between inorganic oxide layers and electrolyte layers in the incompletely applied portion of the inorganic oxide layers, which can be prevented by protecting the inorganic oxide layer with interface bonding layers, etc. In addition, the inverse current can occur when the electrons collected in a transparent electrode via the inorganic oxide layer flow back to the electrolyte layer, by which the value of photoelectric currents decreases. This happens within the pores generated upon application of the inorganic oxide layers, which can be prevented by applying a dense inorganic oxide layer, i.e., an interface bonding layer prior to applying an inorganic oxide layer onto transparent electrodes.

Accordingly, upon radiation of sunlight, photons are absorbed into a dye layer (1007) that is absorbed to the inorganic oxide layer in which the light scattering layer and functional layer are introduced, to electro-transit the dye into the excited state, thereby forming an electron-hole pair. The excited electrons are injected into the conduction band in the inorganic oxide layer and the injected electrons are transported to a first electrode (1002) and then to a second electrode (1009) via an external circuit. Said transported electrons are transported to an electrolyte layer (1008) by oxidation and reduction by the composition of electrolytes contained in the electrolyte layer (1008).

Meanwhile, the dye is oxidized after transporting electrons to inorganic oxides but is reduced due to the electrons transported from the electrolyte layer (1008). As such, the electrolyte layer (1008) functions as a transporter of electrons from a second electrode (1009) to a dye.

The photosensitive dye that is chemically absorbed into the inorganic oxide layer (1003) according to the present invention includes a dye such as a ruthenium composite as materials capable of absorbing ultra-violet rays and light in visible ray regions. The photosensitive dyes that are absorbed into the inorganic oxide layer (1003) include photosensitive dyes consisting of ruthenium complexes, e.g., ruthenium 535 dyes, ruthenium 535 bis-TBA dyes, ruthenium 620-1H3TBA dyes, etc. Preferably, ruthenium 535 dyes are used. Further, the photosensitive dye that is chemically absorbed into the inorganic oxide layer (1003) can be any dyes capable of separating electric charges, which include xanthen based dyes, cyanine based dyes, phorphyrin based dyes and anthraquinone based dyes in addition to ruthenium based dyes.

In order to absorb a dye to the inorganic oxide layer (1003), conventional methods can be used. However, preferred is a method of dissolving a dye in a solvent such as alcohol, nitrile, halogenated hydrocarbon, ether, amide, ester, ketone, N-methylpyrrolidone, etc., and then impregnating a photoelectrode coated with the inorganic oxide layer (1003) in the solution.

Meanwhile, the electrolyte layer (1008) uses electrolytes in which an electrolyte composition comprised in the electrolyte layer of conventional solar cell devices is mixed with the electrospun polymer nanofibers of the present invention. PVDF, PVDF-HFP, PAN, PEO, PMMA, PVA, etc., are preferred for use in the electrospinning, and more preferably, PVDF-HFP.

The polymer nanofibers prepared via the electrospinning method are mixed in a ratio of 5 to 95 percent by weight, preferably 20 to 80 percent by weight, more preferably 40 to 60 percent by weight, based on the total amount of the electrolyte layer (1008).

Figure 2:
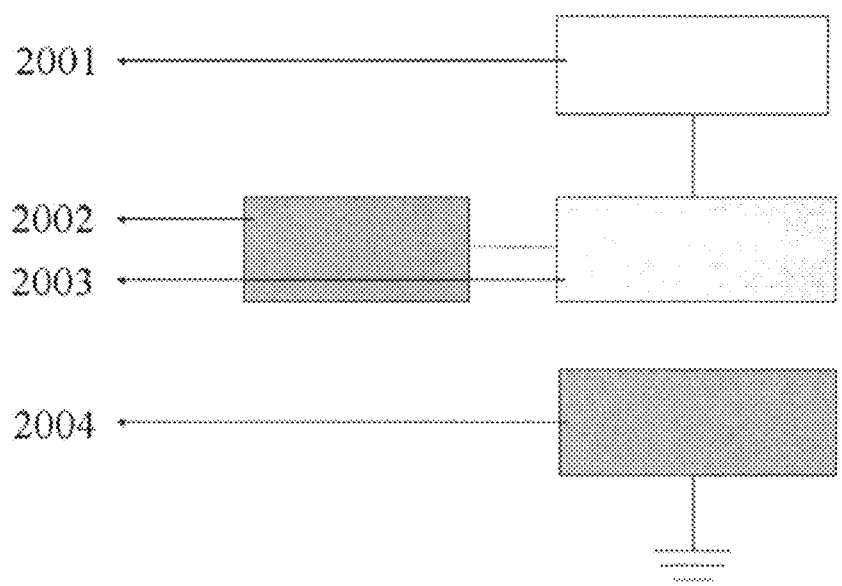
FIG. 2 is a cross-sectional view of the structure of the electrospinning device used in the present invention.

FIG. 2 shows the schematic diagram of the electrospinning device. The electrospinning device comprises a voltage supplier (2001) to apply a voltage to from nanofibers, a solution transporter (2002) to regularly spray the polymer solution, an electrospinner (2003) to produce polymer nanofibers from the polymer solution transported from the solution transporter by using a voltage applied from the voltage supplier, and a collector (2004) to collect the nanofibers spun from the electrospinner.

The polymer nanofibers added in the electrolyte layer (1008) will be described in detail. First, in the case where polymer nanofibers are prepared by polymer concentrations by an electrospinning method, the polymer used is mixed in a solvent in an amount of 5 to 19 percent by weight, 11 to 17 percent by weight. As the solvent used herein, for example, dimethylacetamide and acetone may be present in a weight ratio of 3 to 7.

In the meantime, the solid electrolyte of the present invention can further comprise nano-sized metal additives (e.g., Ag) or inorganic nanofiller. As the inorganic nanofiller, although it is not limited to the following, $Al_2O_3$ or $BaTiO_3$ is preferred.

When metal additives are introduced into polymer nanofibers, they can be mixed in a solvent in an amount of 0.1 to 30 percent by weight, and preferably 1 to 20 percent by weight, relative to the polymer concentration of a solution used in electrospinning. When inorganic nanofiller additives are introduced into polymer nanofibers, they can be mixed in a solvent in an amount of 1 to 50 percent by weight, and preferably 10 to 40 percent by weight, relative to the polymer concentration of a solution used in electrospinning Secondly, in the case where polymer nanofibers are prepared by applied voltages by an electrospinning method, the electrospinning is carried out under the condition where the polymer weight and tip to collector distances (TCD) are held at 15 percent by weight and 15 cm, respectively, and the applied voltage ranges from 6 kV to 25 kV, preferably from 8 kV to 20 kV.

Lastly, in the case where polymer nanofibers are prepared by TCDs by an electrospinning method, the electrospinning is carried out under the condition where the polymer weight and the applied voltage are fixed at 15 percent by weight and 14 kV, respectively, and the TCD is 9 to 21 cm, preferably 13 to 19 cm. In a solution transporter, the polymer solution is supplied at a flow rate of 1 to 5 ml/h, preferably 2 ml/h.

In the case where polymer nanofibers are prepared by the electrospinning methods described above, it is most preferred under the conditions where the polymer concentration ranges from 11 percent by weight to 17 percent by weight, the applied voltage is between 8 kV and 14 kV, the TCD is from 13 to 19 cm, and the solution is supplied at a flow rate of 2 ml/h.

In addition, the electrolyte used in the electrolyte layer (1008) can comprise a combination of $I_2$ and metal iodides or organic iodides (metal iodides or organic iodides/$I_2$) as a redux pair. Further, a combination of $Br_2$ and metal bromides or organic bromides (metal bromides or organic bromides/$Br_2$) can also be used as a redux pair.

In the electrolyte used in the present invention, the metal cations in metal iodides or metal bromides include Li, Na, K, Mg, Ca, Cs, etc. As the cations in organic iodides or organic bromides, ammonium compounds such as imidazolium, tetra-alkyl ammonium, pyridinium, triazolium, etc., are suitable, but the cations are not limited to the compounds listed above. At least two compounds selected from the above can be mixed for use in the electrolyte, and a redux pair of LiI or imidazolium iodide and $I_2$ combined is particularly preferred.

In the case where the solvents described above are used in the electrolyte composition according to the present invention, metal iodides or metal bromides are combined with iodide ($I_2$) or brome ($Br_2$) and the combination can be used as a redux pair. As such a redux pair, LiI/$I_2$, KI/$I_2$, NaI/$I_2$, CsI/$I_2$, $Pr_4$NI (tetrapropyl ammonium iodide)/$I_2$, TBAI (tetrabutyl ammonium iodide)/$I_2$, etc., are used and preferably, a pair of TBAI/$I_2$.

Of the electrolytes that can be used according to the present invention, as organic halides usable as an ionic liquid, there are n-methylimidazolium iodide, n-ethylimidazolium iodide, 1-benzyl-2- methylimidazolium iodide, 1-ethyl-3- methylimidazolium iodide, 1-butyl-3-methylimidazolium iodide, etc. In particular, preferred is 1-ethyl-3-methylimidazolium iodide and the materials listed above may be used in combination with iodide ($I_2$). In the case of using such an ionic liquid, i.e., dissolved salts, an electrolyte composition can form solid electrolytes in the absence of a solvent.

Meanwhile, the second electrode (1009) that is coated on the opposite surface of a second substrate (1010) functions as a cathode. The second electrode (1009) can be spread or coated on the opposite surface of the second substrate (1010) by using sputtering or spinning coating.

The material that can be used in the second electrode (1009) is materials having a greater work function value than that of the material used in the first electrode (1002) including platinum (Pt), gold, carbon, etc., and platinum is preferred.

Said second substrate (1010) is a transparent material similar to the first substrate (1001). The second substrate (1010) can be prepared from transparent materials such as glass or plastics comprising PET (polyethylene terephthalate), PEN (polyethylene naphthelate), PP (polypropylene), PI(polyamide), TAC (tri acetyl cellulose), etc., and preferably it is prepared from glass.

The dye-sensitized solar cells prepared according to the preferred working examples of the present invention are manufactured as follows.

First, inorganic oxides, preferably titanium oxides in a colloid state are spread or cast at a thickness between about 5 and 30 μm on the surface of a first substrate coated with a first electrode material and sintered at a temperature of from about 450 to about 550° C. to form the organism removed first substrate/first electrode/inorganic oxides coated/layered photo-electrodes. Subsequently, in order to absorb a dye to the prepared inorganic oxide layer, a dye, for example, ruthenium 535 is added to an ethanol solution that has been in advance prepared to prepare a dye solution. Thereafter, a transparent substrate coated with the inorganic oxide layer (e.g., photo-electrode or glass substrate coated with FTO, etc.) is put to the formed dye solution, by which the dye is absorbed to the inorganic oxide layer. After completely absorbing the dye to the inorganic oxide layer, in order to remove the physically absorbed dye, the inorganic oxide layer is washed with ethanol, etc., and then dried.

If the transparent substrate coated with the dye absorbed inorganic oxide layer is prepared, the polymeric fiber according to the present invention is used as electrolytes with addition of an electrolyte solution and the platinum electrodes fabricated by sintering a platinum precursor material are bonded on a glass substrate to obtain the dye-sensitized solar cells according to the present invention.

WORKING EXAMPLES

Example 1

Figure 3:
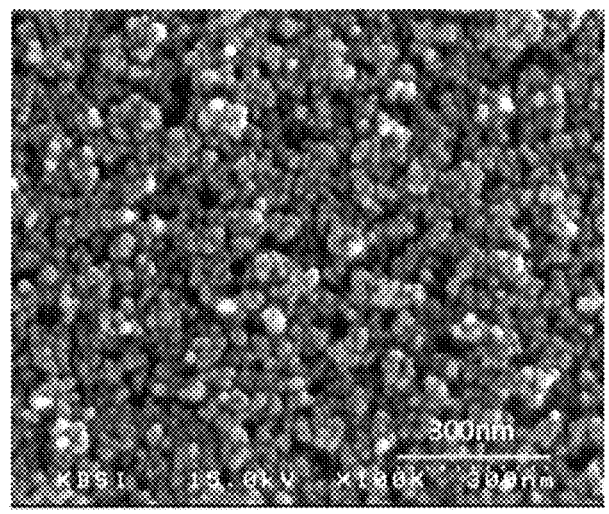
FIG. 3 is a SEM image of the surface after the inorganic oxide layer is prepared according to the working example of the present invention.
Figure 4:
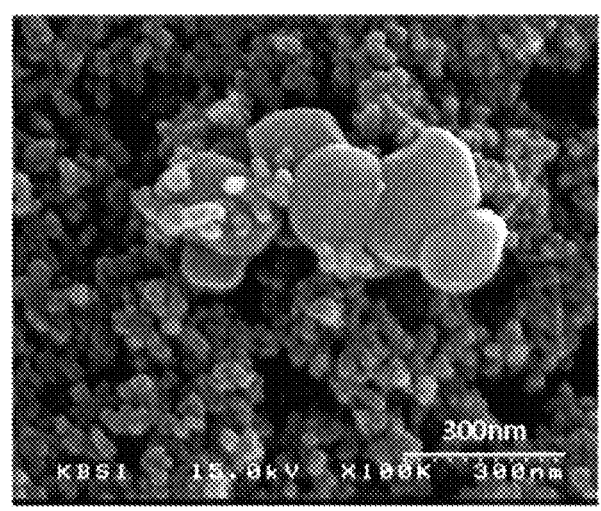
FIG. 4 is a SEM image of the surface after the light scattering layer is prepared on the inorganic oxide layer prepared according to the working example of the present invention.
Figure 5:
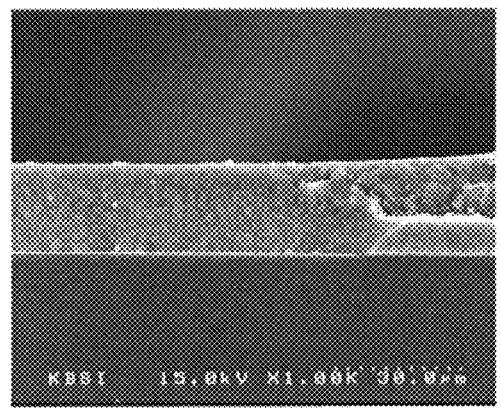
FIG. 5 is a SEM image of the side view after the light scattering layer is prepared on the inorganic oxide layer prepared according to the working example of the present invention.

Preparation of an Inorganic Oxide Layer in which an Interface Bonding Layer(BL) and Scattering Layer(SL) are Introduced After preparation of the mixed solution of titanium(IV) isopropoxide and ethanol in the volume ratio of 1:10, by spin-coating method, the mixed solution is applied tenuously at 1500 rpm for 20 seconds on the FTO glass substrate (Fluorine doped tin oxide, $SnO_2$:F, 15 ohm/sq) which is cut in 15 mm×15 mm size, and then washed. Then, it was put into an electric crucible, the temperature was raised from the room temperature to 500° C. and an organic compound was removed for about 30 minutes, and it was cooled down to the room temperature. The heating rate and cooling rate are about 5° C./min, respectively. After applying tenuously the titanium oxide paste of the colloidal state with a particle size of 9 nm on the substrate by doctor-blade method to have a thickness of about 10 μm, it was put into the electric crucible, the temperature was raised from the room temperature to 500° C. and cooled down to the room temperature. Next, after applying tenuously the mixed solution of titanium (IV) isopropoxide and ethanol on the substrate by introducing the interface bonding layer I in the same manner as the first method, it was put into the electric crucible, the temperature was raised from the room temperature to 500° C. and cooled down to the room temperature. After applying tenuously the titanium oxide paste of the colloidal state with the particle size of 300 nm on the substrate by doctor-blade method, it was put into the electric crucible, the temperature was raised from the room temperature to 500° C. and cooled down to the room temperature. The $TiO_2$ layer with the particle size of 300 nm or more than 300 nm was introduced to increase the absorption of light by scattering the light. At last, after applying tenuously the mixed solution of titanium (IV) isopropoxide and ethanol on the substrate, it was put into the electric crucible, the temperature was raised from the room temperature to 500° C. and cooled down to the room temperature for introducing the interface bonding layer II in the same manner as the first method. FIGS. 3 to 5 show the SEM picture and the side, sectional picture of the inorganic oxide layer having the interface bonding layer introduced and the light scattering layer on it.

Example 2

Absorbing a Dye

The substrate in which the organic compound was removed and only applied with the titanium oxide is put into the dye solution at the room temperature for 24 hours so that the dye is absorbed on the titanium oxide layer. The dye used was cis-bis(isothiocyanato)bis(2,2'-bipyridyl-4,4'-dicarboxylatol)-ruthenium(II) (Ruthenium 535 dye) commercially available from the Solaronix(Switzerland). The solution of Ruthenium 535 dye is prepared by melting it with the concentration of 20 mg in 100 ml of ethanol. After soaking it for 24 hours and taking it out from the solution, the titanium oxide substrate absorbed with the dye is washed again with ethanol in order to remove the physically absorbed dye layer, and then the substrate is made by drying it again at 60° C.

The dye 2 was used for the dye-sensitized solar cell using polyvinyl alcohol fiber. The dye used was cis-diisothiocyanato-bis(2,2-bipyridyl-4,4-dicarboxylate)ruthenium(II) bis (tetrabutylammonium) commercially available from the Solaronix(Switzerland). The solution of Ruthenium 535 bis TBA dye is prepared by melting it with the concentration of 0.5 mmol in pure ethanol. After soaking it for 24 hours and taking it out from the solution, the titanium oxide substrate absorbed with the dye is washed again with ethanol in order to remove the physically absorbed dye layer, and then the substrate is made by drying it again at 60° C.

Example 3

Preparation of PVDF-HFP Polymer Solution for Electrospinning

Polyvinylidenefluoride-hexafluoropropylene was dissolved in the mixed solution of acetone and N,N-dimethylacetamide (weight ratio of 7:3) to prepare PVDF-HFP polymer solution. It was dissolved completely by stirring it in the stirrer for 24 hours, and treating it ultrasonically for 30 minutes.

Example 4

Preparation of Ag-Containing PVDF-HFP Polymer Solution

Polyvinylidenefluoride-hexafluoropropylene was dissolved in the mixed solution of acetone and N,N-dimethylacetamide (weight ratio of 2:1) following addition of Ag in the amount of 1-20 wt % relative to the polymer to prepare PVDF-HFP polymer solution. It was dissolved completely by stirring it in the stirrer for 24 hours, and treating it ultrasonically for 30 minutes.

Example 5

Preparation of Inorganic Nonofiller-Containing PVDF-HFP Polymer Solution

Polyvinylidenefluoride-hexafluoropropylene and individually quantified $Al_2O_3$ and $BaTiO_3$ as an inorganic nanofiller were mixed to prepare polymer solution containing inorganic nanofiller, wherein the amount of the inorganic nanofiller used was 10-40 wt % relative to the polymer used. The mixture was dissolved in the mixed solution of acetone and N,N-dimethylacetamide (weight ratio of 7:3). It was dissolved completely by stirring it in the stirrer for 24 hours, and treating it ultrasonically for 30 minutes.

Example 6

Preparation of PVA Polymer Solution for Electrospinning

Polyvinylalcohol(PVA) was dissolved in the distilled water with the amount of 10 wt % relative to the distilled water to prepare PVA polymer solution. The solution was stirred in the stirrer at 80° C. for 6 hours, and further stirred at lowered temperature, room temperature, for 24 hours to dissolve it in the distilled water completely, and then treated ultrasonically for 1 hour.

Example 7

Preparation of Ag-Containing PVA Polymer Solution

Polyvinylalcohol(PVA) was dissolved in the distilled water with the amount of 10 wt % relative to the distilled water before adding Ag to prepare PVA polymer solution containing Ag. The solution was stirred in the stirrer at 80° C. for 6 hours, and the temperature was lowered to room temperature to dissolve polyvinylalcohol in the distilled water completely. 2-3 drops of dilute solution of nitric acid were added to the solution to prevent Ag being reduced during stirring the polymer solution formed by adding Ag with the amount of 0.01 wt % relative to the polymer. The solution was further stirred in the stirrer for 24 hours to mix well, and treated ultrasonically for 1 hour.

Example 8

Preparation of Polymer Blended Solution for Electrospinning

The Polymer blended solution was prepared by adding polystyrene, polymethylmethacrylate, respectively, to polyvinylidenefluoride-hexafluoropropylene. The solvent used was DMF when PVDF-HFP and PS were blended, while it was dissolved in the mixed solution of acetone and N,N-dimethylormamide (weight ratio of 7:3) when PVDF-HFP and PMMA were blended. The solution was stirred in the stirrer for 24 hours and treated ultrasonically for 30 minutes to dissolve completely.

Example 9

Preparation of PVDF-HFP Polymer Nanofiber by Electrospinning

Electrospinning was performed by varying wt % of the polymer, the supplied voltage, and the gap between a tip and a collector to obtain the various diameters in nanoscale. The polymer dissolved in solvent is introduced to an electrospinner at constant rate in a solution transporter. The output rate was 2 ml/h in the experiment. When the polymer was dissolved in solvent, the polymer nonofiber was fabricated by changing the amount of the polymer between 11 wt % and 17 wt % relative to the solution, wherein the amount of the polymer is suitable range as mentioned in the structure of the invention. Electrospinning was carried out by varying the voltage from the voltage supplier between 8 kV and 14 kV. Electrospinning was carried out by varying the gap between the tip and the collector between 13 cm and 19 cm. The electrospun polymer nonofiber was fabricated at the optimum condition of 15 wt %, 14 kV and 15 cm.

Example 10

Preparation of Ag-Containing PVDF-HFP Polymer Nanofibers by Electrospinning

Electrospinning was performed by varying wt % of the polymer, the supplied voltage, and the gap between the tip and the collector to obtain the various diameters of PVDF-HFP nanofiber containing Ag. In addition, the polymer nonofiber was fabricated by changing the condition by introducing 1 wt %-20 wt % of Ag. The output rate from the solution transporter was 0.2-2.0 ml/h in the experiment. Electrospinning was carried out by varying the voltage from the voltage supplier between 8 kV and 20 kV. The electrospun polymer nonofiber was fabricated by varying the gap between the tip and the collector between 13 cm and 21 cm.

Example 11

Preparation of Inorganic Nonofiller-Containing PVDF-HFP Polymer Nanofiber by Electrospinning Electrospinning was performed by varying wt % of the polymer, the supplied voltage, and the gap between the tip and the collector to obtain the various diameters of PVDF-HFP nanofiber containing the inorganic nanofiller in nanoscale. In addition, the polymer nonofiber was fabricated by changing the condition by introducing 10 wt %-40 wt % of the inorganic nanofiller ($Al_2O_3$, $BaTiO_3$). The output rate from the solution transporter was 1.5 ml/h in the experiment. Electrospinning was carried out by varying the voltage from the voltage supplier between 12 kV and 15 kV. The electrospun polymer nonofiber was fabricated by varying the gap between the tip and the collector between 15 cm and 18 cm.

Example 12

Preparation of the Polymer Nanofibers by PVA Electrospinning

When the polyvinylalcohol(PVA) fiber was prepared, electrospinning was performed by varying wt % of the polymer, the supplied voltage, and the gap between the tip and the collector to obtain the diameter in nanoscale as suited above. The output rate from the solution transporter was 0.6 ml/h in the experiment. When the polymer was dissolved in solvent, the polymer nonofiber was fabricated by changing the amount of the polymer between 8 wt %-10 wt % relative to the solution. The fiber was fabricated by varying the voltage from the voltage supplier between 15 kV and 20 kV. Electrospinning was carried out by varying the gap between the tip and the collector between 15 cm and 22 cm. The polymer nonofiber was fabricated at the optimum condition, 9 wt %, 20 kV and 20 cm.

Example 13

Preparation of the Polymer Nanofiber Using Electrospinning of Ag-Containing PVA When the Ag-containing polyvinylalcohol fiber was prepared, electrospinning was carried out at the same condition as example 7. An adapter made with graphite was used to prevent Ag being reduced during electrospinning, while the adapter made with stainless steel is usually used for connecting the tip and the nozzle when electrospinning is performed. Lastly, after spinning the Ag-containing fiber, it was pressed on the hot plate for 15 minutes to reduce Ag.

Example 14

Preparation of the Polymer Nanofiber Using Electrospinning of the Blended Polymer After blending PVDF-HFP and polystyrene, electrospinning was carried out with output rate from the solution transporter of 0.5 ml/h in the experiment and varying the voltage from the voltage supplier between 13 kV and 20 kV. The electrospun polymer nanofiber was fabricated by varying the gap between the tip and the collector between 15 cm and 23 cm. The polymer nonofiber was fabricated at the optimum condition, 15 wt %, 20 kV and 23 cm.

Example 15

Figure 6:
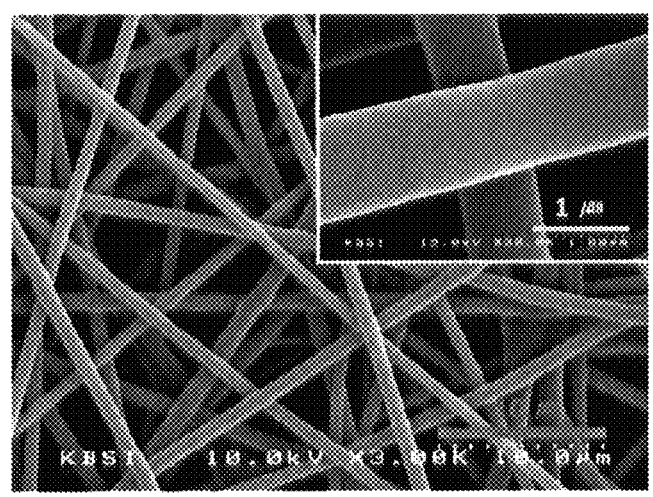
FIGS. 6(A) and 6(B) are a SEM image of the surface of the PVDF-HFP fiber having nano-sized diameter and prepared according to the working example of the present invention and an image of the distribution of the diameters, respectively.
Figure 6:
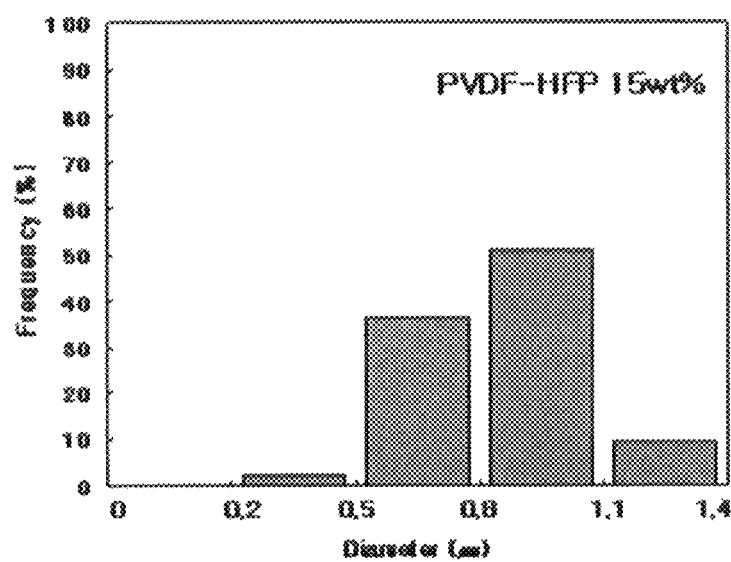
Figure 7:
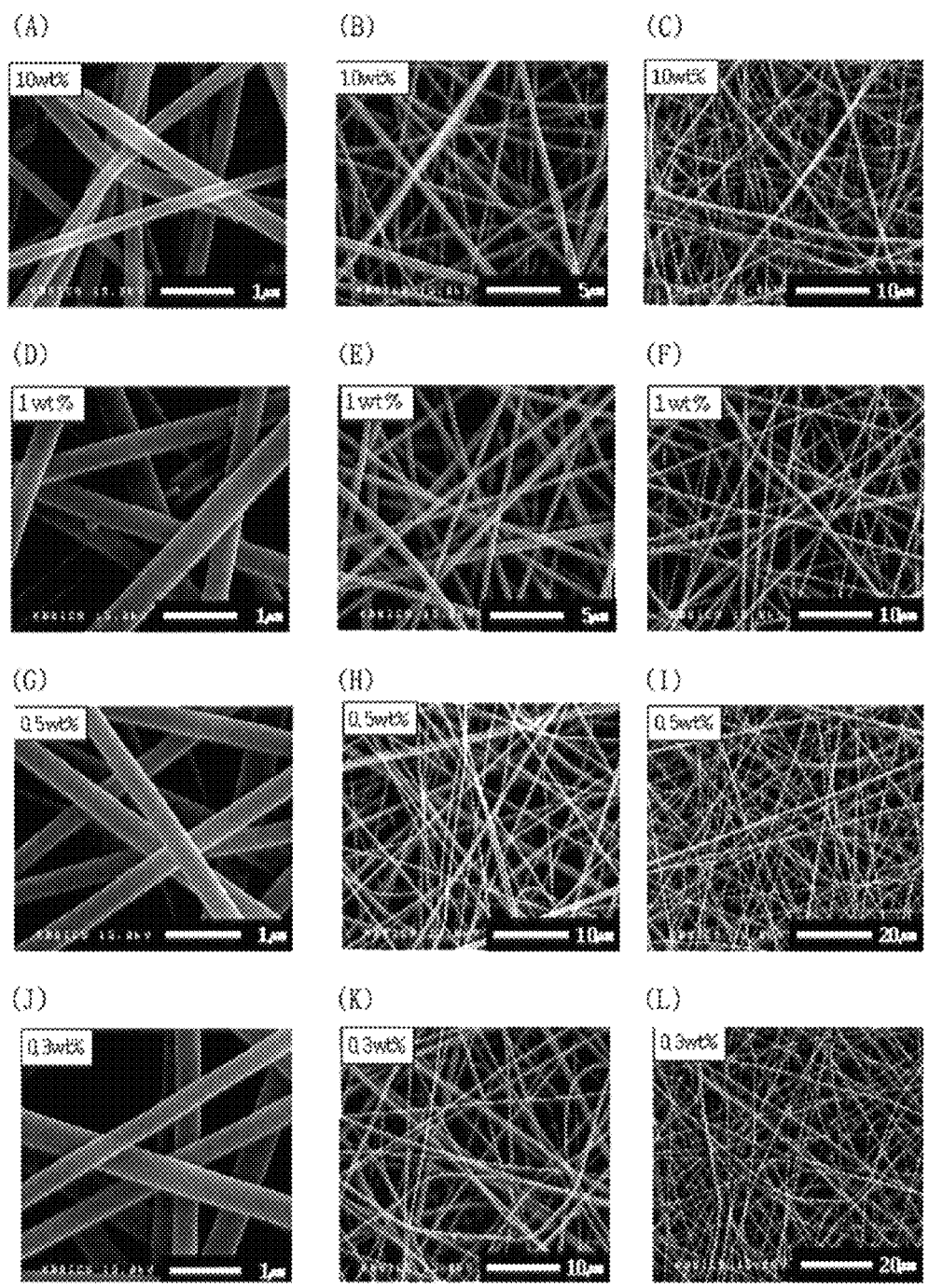
FIGS. 7(A) to 7(L) are SEM images of the surface after the fiber is prepared by adding Ag in proportion to each weight percent to PVDF-HFP having a nanoscale diameter and prepared according to the working examples of the present invention.
Figure 8:
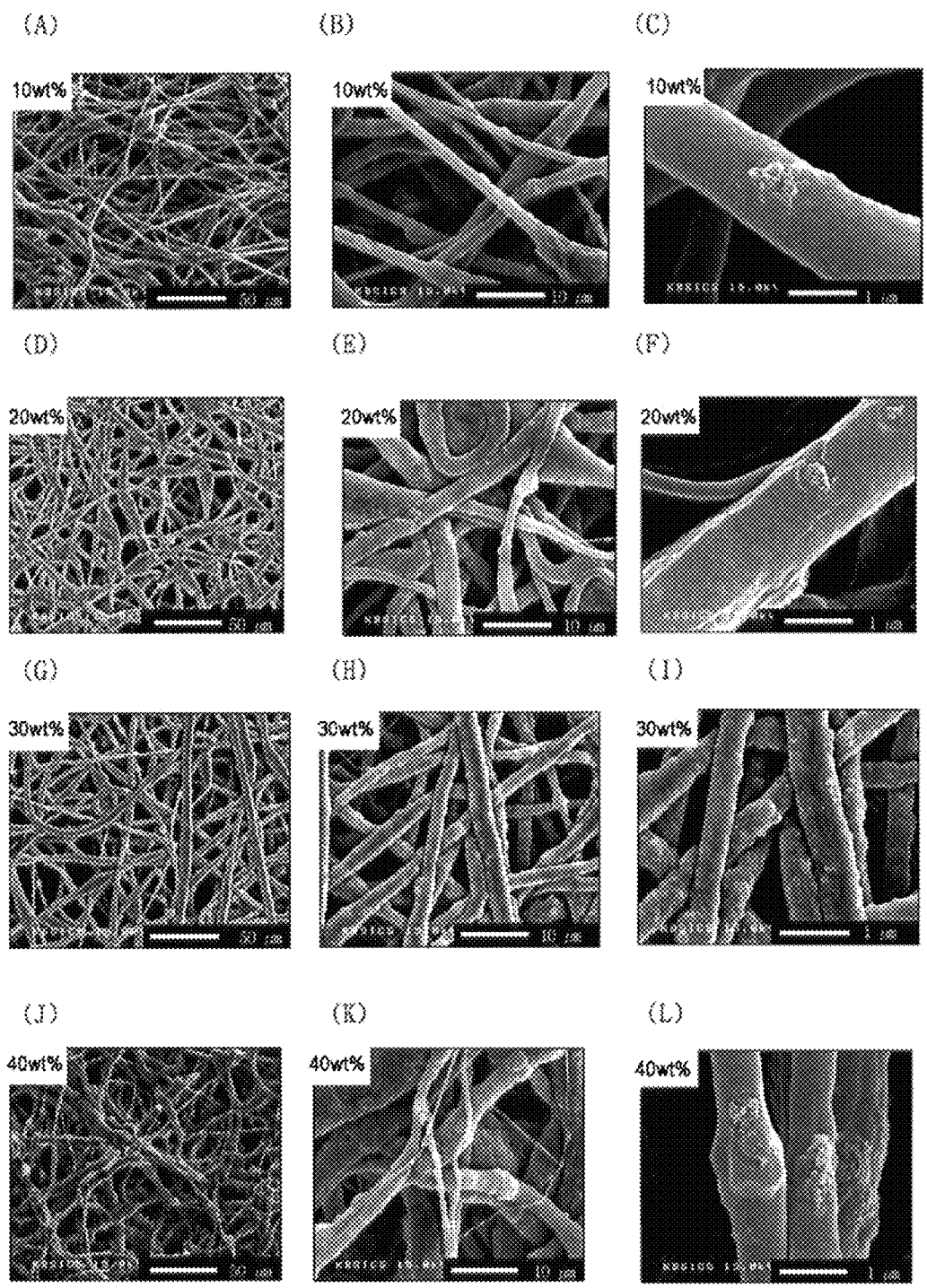
FIGS. 8(A) to 8(L) are SEM images of the surface after the fiber is prepared by adding inorganic nanofillers $Al_2O_3$ in proportion to each weight percent to PVDF-HFP having a nanoscale diameter and prepared according to the working examples of the present invention.
Figure 9:
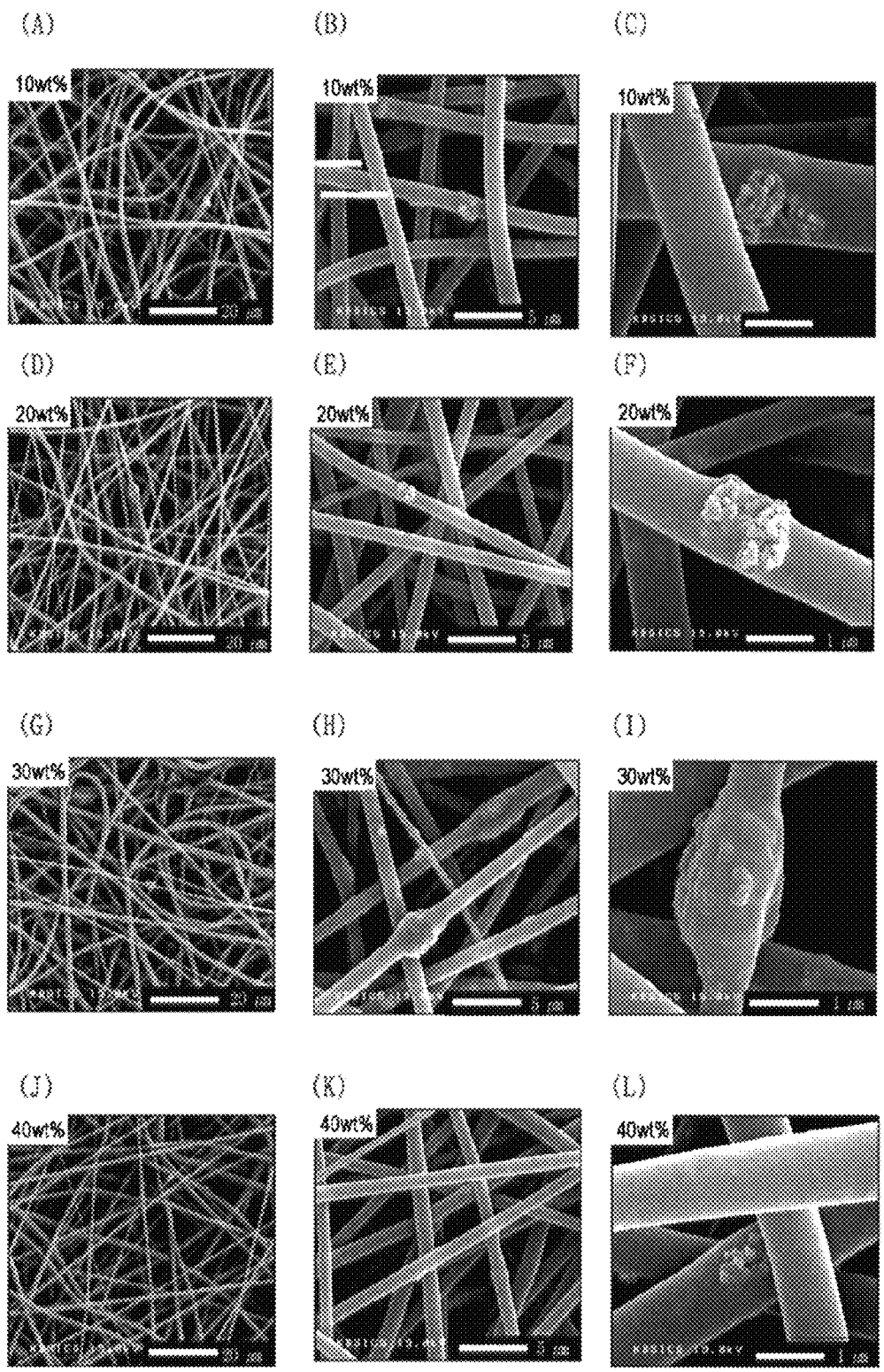
FIGS. 9(A) to 9(L) are SEM images of the surface after the fiber is prepared by adding inorganic nanofillers $BaTiO_3$ in proportion to each weight percent to PVDF-HFP having a nanoscale diameter and prepared according to the working examples of the present invention.

Analysis of the Surface of PVDF-HFP Polymer Nanofiber Using the Scanning Electron Microscopy and the Distribution of Nanofiber FIGS. 6(A) and (B) are the surface image and the distribution chart of the diameter of the polymer fiber with polymer of 15 wt %. The polymer nanofiber was fabricated by changing wt % of the polymer at the supplied voltage of 14 kV, the gap between the tip and the collector of 15 cm, and the solution supplying rate of 2 ml/h. As shown in FIGS. 6(A) and (B), the nanofiber obtained was identified that it had the most uniform distribution of the diameter of 800-1000 nm.

Example 16

Analysis of the Surface of Ag-Containing PVDF-HFP Polymer Nanofiber using the Scanning Electron Microscopy and the Distribution of Nanofiber FIGS. 7(A) to (L) are the surface images of the polymer fiber according to varying the amount of Ag contained in the polymer between 0.3 and 10 wt %. The polymer nanofiber was fabricated by changing wt % of Ag contained in the polymer at the supplied voltage between 15 and 20 kV, the gap between the tip and the collector between 15 and 20 cm, and the solution supplying rate between 0.3 and 2 ml/h. As shown in FIGS. 7(A) to (L), the nanofiber obtained was identified that it had the most uniform distribution of the diameter of 200-500 nm.

Example 17

Analysis of the Surface of Inorganic Nanofiller-Containing PVDF-HFP Polymer Nanofiber Using the Scanning Electron Microscopy and the Distribution of nanofiber FIGS. 8(A) to (L) are the surface images of the polymer fiber according to varying the amount of $Al_2O_3$ as the inorganic nanofiller between 10 and 40 wt %. The polymer nanofiber was fabricated by changing wt % of the inorganic nanofiller at the supplied voltage of 12 kV, the gap between the tip and the collector of 15 cm, and the solution supplying rate of 1.5 ml/h. As shown in FIGS. 8(A) to (L), the nanofiber obtained had the best fiber morphology when 40 wt % of $Al_2O_3$ was added.

FIGS. 9(A) to (L) are the surface images of the polymer fiber according to varying the amount of $BaTiO_3$ as the inorganic nanofiller between 10 and 40 wt %. The polymer nanofiber was fabricated by changing wt % of the inorganic nanofiller at the supplied voltage of 12 kV, the gap between the tip and the collector of 15 cm, and the solution supplying rate of 1.5 ml/h. As shown in FIGS. 9(A) to (L), the nanofiber obtained was indicated that it had gathering-shape and the most uniform distribution of the diameter of 500-1000 nm.

Example 18

Figure 10:
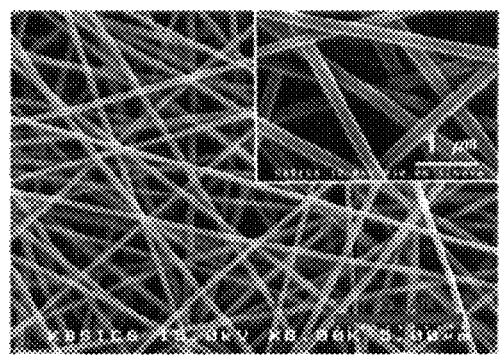
FIGS. 10(A) to 10(B) are a SEM image of the surface of PVA fibers having a nanoscale diameter and prepared according to the working examples of the present invention and an image of the diameter distribution, respectively.
Figure 10:
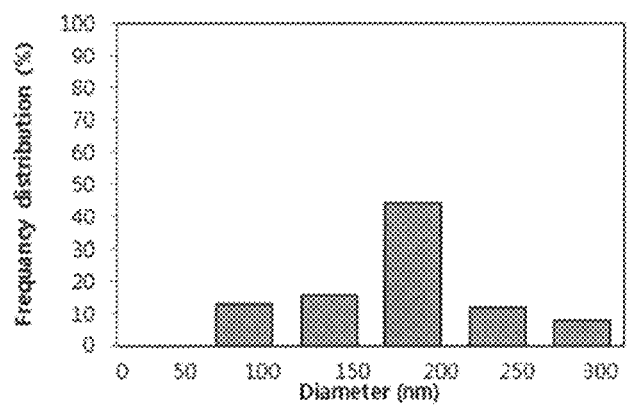

Analysis of the Surface of PVA Polymer Nanofiber Using the Scanning Electron Microscopy and the Distribution of Nanofiber FIGS. 10(A) and (B) are the surface images and the distribution chart of the diameter of the PVA polymer fiber. The supplied voltage was 20 kV, the gap between the tip and the collector was 20 cm, and the solution supplying rate was 0.6 ml/h when the polymer fiber of the image was electrospun. As shown in FIG. 10 (B), the nanofiber obtained was indicated that it had the most uniform distribution of the diameter of 180-200 nm.

Example 19

Figure 11:
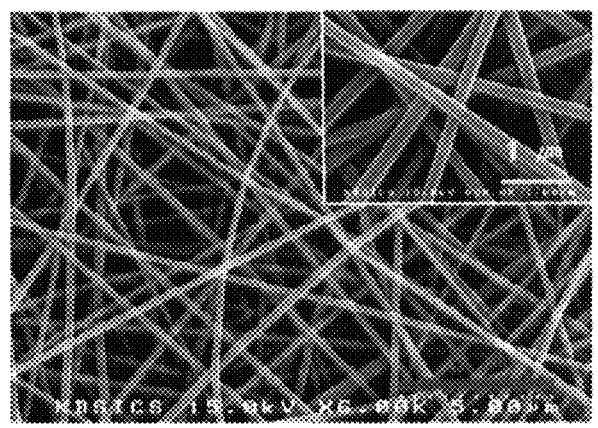
FIG. 11 is a SEM image of the surface of PVA fibers containing silver and having a nanoscale diameter and prepared according to the working examples of the present invention.

Analysis of the Surface of Ag-Containing PVA Polymer Nanofiber Using the Scanning Electron Microscopy and the Distribution of Nanofiber FIG. 11 is the surface image of Ag-containing PVA polymer fiber. The supplied voltage was 20 kV, the gap between the tip and the collector was 20 cm, and the solution supplying rate was 0.6 ml/h when the polymer fiber of the image was electrospun. Ag-containing PVA polymer fiber had similar range of the diameter as the polymer which is not containing Ag. Although Ag is contained in PVA fiber, the original morphology was identified not to be changed.

Example 20

Figure 12:
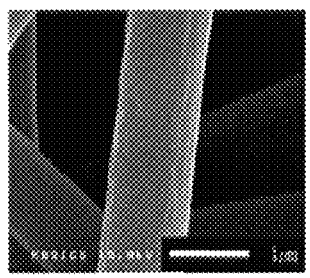
FIGS. 12(A) to 12(C) are SEM images of the surface of the blended fibers of PVDF and PS having a nanoscale diameter and prepared according to the working examples of the present invention.
Figure 12:
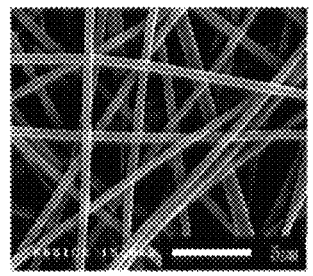
Figure 12:
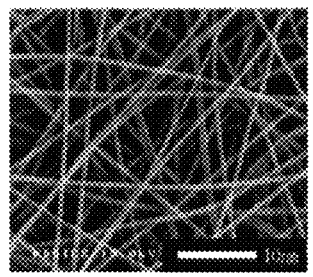

Analysis of the Surface of Blended Polymer Nanofiber Using the Scanning Electron Microscopy and the Distribution of Nanofiber FIGS. 12(A) to (C) show the surface image of blended polymer nanofiber of PVDF-HFP and polystyrene. The supplied voltage was 20 kV, the gap between the tip and the collector was 21 cm, and the solution supplying rate was 5.0 ml/h when the polymer fiber of the image was electro spun. The diameter of the blended polymer nanofiber of PVDF-HFP and polystyrene was about 1000 nm, which was thicker than the non-blended PVDF-HFP nanofiber, and the shape of the strand was rough.

Figure 13:
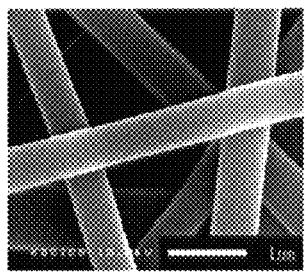
FIGS. 13(A) to 13(C) are SEM images of the surface of the blended fibers of PVDF and PMMA having a nanoscale diameter and prepared according to the working examples of the present invention.
Figure 13:
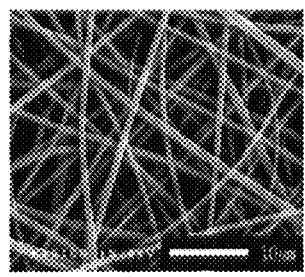
Figure 13:
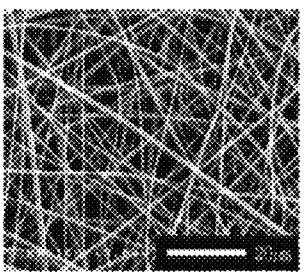

FIGS. 13(A) to (C) show the surface images of blended polymer nanofiber of PVDF-HFP and PMMA. The supplied voltage was 20 kV, the gap between the tip and the collector was 21 cm, and the solution supplying rate was 4.0 ml/h when the polymer fiber of the image was electro spun. The blended polymer nanofiber of PVDF-HFP and PMMA had similar range of the diameter, about 600 nm, as the non-blended PVDF-HFP nanofiber and the shapes of the strand of both were nearly similar.

Example 21

Preparation of an Electrolyte Solution

An electrolyte solution was prepared by mixing tetrabutylammonium iodide of 0.2 mol, iodine of 0.05 mol, and 1-profile-3-methylimidazolium iodide of 0.3 mol in the solvent of ethylene carbonate, polypropylene carbonate, and acetonitrile (the volume ratio of 8:2:5), and then it was stirred for 24 hours.

In the example of the dye-sensitized solar cell prepared by utilizing polyvinylalcohol fiber, an electrolyte solution was prepared by mixing tetrabutylammonium iodide of 0.02 mol, iodine of 0.08 mol, and 1-profile-3-methylimidazolium iodide of 0.03 mol in the solvent of ethylene carbonate, polypropylene carbonate, and acetonitrile (the volume ratio of 8:2:5), and then it was stirred for 24 hours.

Example 22

Making an Electrolyte Layer Using the Polymer Nanofiber

Polymer nanofiber fabricated following examples 6 to 8 were placed on the substrate of titanium oxide absorbed by the dye of example 2, and then the electrolyte solution of 0.035 ml is dropped down to the upper part of the substrate by using micro-pipette. Thereafter, it was dried in the oven at 40-50□ for 2 to 3 hours to evaporate the solvent.

Example 23

Making a Pt Electrode

The paste containing the Pt precursor was used to make the transparent dye-sensitized solar cell. The paste containing the Pt precursor is commercially available from Solaronix (Switzerland).

Pt was applied on the FTO glass substrate which is cut in 15 mm×10 mm size in the same manner as titanium oxide layer of example 1 by using the paste containing Pt precursor at the elevated temperature of 400° C. from room temperature. As the result of measurement of the obtained Pt electrode by using the Alpha Step, the thickness was identified as about 100 nm.

Example 24

Making of the Solid Type Dye-Sensitized Solar Cell Device

The dye-sensitized solar cell device was made by device junction of the electrode substrate containing the polymer fiber and electrolyte which were applied on the dye-absorbed titanium oxide layer following example 22 with Pt electrode substrate made following example 23.

Example 25

Measurement of the Electro-Optic Property of the Dye-Sensitized Solar Cell Device The electro-optical property of the dye-sensitized solar cell manufactured following example 24. The voltage-current density of the dye-sensitized solar cell having the electrolyte containing the polymer fiber according to example 22 was measured at the standard condition (AM 1.5, 100 mW/cm$^2$, 25□) by using a solar simulator (PEC-L11, PECCELL), wherein the solar simulator was amended by mounting the 150 W xenon lamp and Keithley and using the standard silicon cell.

The Result of Electro-Optic Property

The current-voltage graph according to the result of measuring the electro-optic property of the dye-sensitized solar cell device was showed in FIGS. 14 to 19, respectively.

Figure 14:
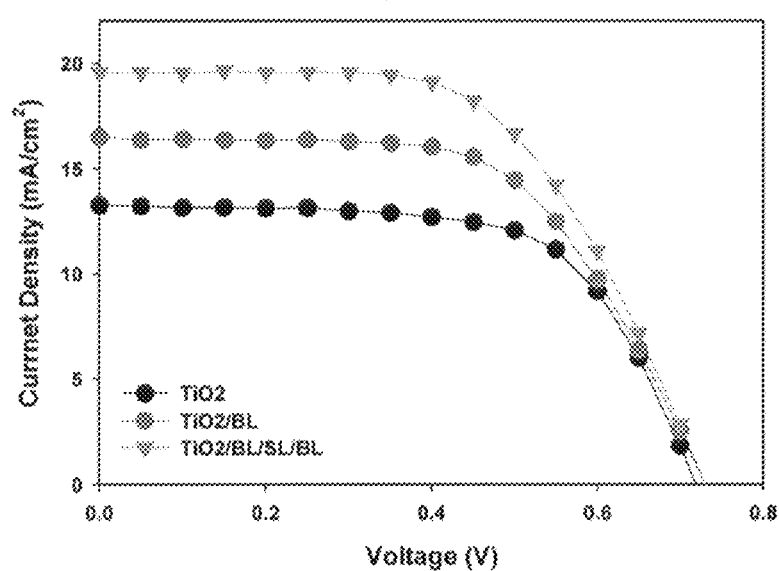
FIG. 14 is a graph of the voltage-current density of the dye-sensitized solar cell device, which uses PVDF-HFP fibers having a nanoscale diameter and prepared according to the working examples of the present invention at 100 $mW/cm^2$ illumination.

FIG. 14 is a graph showing the voltage-current density of the dye-sensitized solar cell device at the state of illumination of 100 mW/cm$^2$ using PVDF-HFP fiber having the diameter in nanoscale fabricated following example 9. According to FIG. 14, the current density was increased as introducing the interface bonding layer and the scattering layer.

Figure 15:
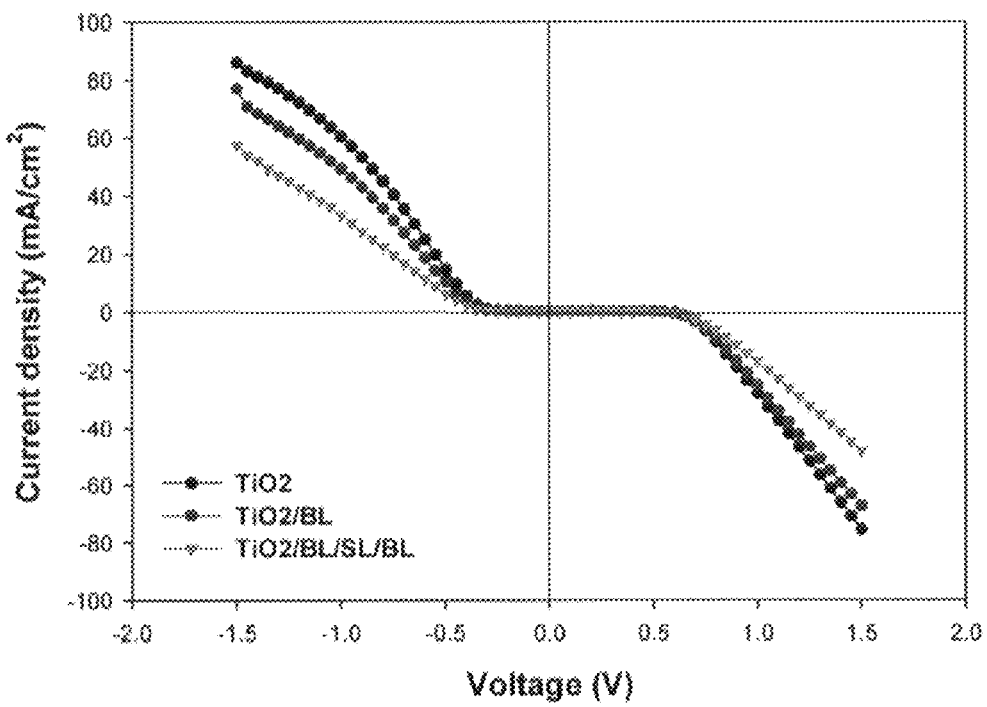
FIG. 15 is a graph of the voltage-current density of the dye-sensitized solar cell device, which uses PVDF-HFP fibers having a nanoscale diameter and prepared according to the working examples of the present invention in the dark condition.

FIG. 15 is a graph showing the voltage-current density of the dye-sensitized solar cell device at the dark state using the PVDF-HFP fiber having the diameter in nanoscale fabricated following example 9. It is identified that the voltage is increased as introducing the interface bonding layer and the scattering layer, since the two layers prevent the recombination of TiO$_2$ layer and electrode layer.

Table 1 shows the property of the dye-sensitized solar cell device made by adding PVDF-HFP polymer fiber fabricated at the condition that supplied voltage is 14 kV, the gap between the tip and the collector is 15 cm, and the solution supply velocity is 2 ml/h, and the wt % of the polymer is changing. It is identified that the current density was increased significantly as introducing the interface bonding layer and the scattering layer, while the open circuit voltage and Fill Factor were not greatly varied. Therefore, the efficiency of conversion of the total energy was improved by 60%, and the dye-sensitized solar cell having high efficiency of 8.58% could be manufactured.

TABLE 1

Comparison of photovoltaic performances of the dye-sensitized solar cell device using PVDF-HFP polymer nanofiber in the inorganic oxide layer introduced with the interface bonding layer and the scattering layer

|  | Open circuit Voltage (V) | Current density (mA/cm$^2$) | Fill Factor | Energy Conversion Efficiency (%) |
|---|---|---|---|---|
| TiO$_2$ | 0.694 | 12.4 | 0.627 | 5.40 |
| TiO$_2$/BL | 0.732 | 16.5 | 0.598 | 7.23 |
| TiO$_2$/BL/SL/BL | 0.748 | 19.5 | 0.588 | 8.58 |

Table 2 shows the property of the dye-sensitized solar cell device made by adding Ag-containing PVDF-HFP polymer fiber fabricated at the condition that supplied voltage is between 8 kV and 20 kV, the gap between the tip and the collector is between 13 and 21 cm, and the solution supply velocity is between 0.2 and 2 ml/h, and the wt % of Ag relative to the polymer is changing. It is identified that the current density is increased significantly when Ag of 1/00 wt % was added.

TABLE 2

Comparison of photovoltaic performances of the dye-sensitized solar cell device using Ag-containing PVDF-HFP polymer nanofiber

| Ag wt % | Open circuit Voltage (V) | Current density (mA/cm$^2$) | Fill Factor | Energy Conversion Efficiency (%) |
|---|---|---|---|---|
| PCDF-HFP | 0.67 | 11.4 | 0.47 | 3.60 |
| 1/100 Ag | 0.67 | 12.0 | 0.41 | 3.34 |
|  | 0.69 | 11.0 | 0.49 | 3.68 |
| 1/200 Ag | 0.69 | 10.4 | 0.50 | 3.54 |
|  | 0.69 | 10.4 | 0.50 | 3.58 |
| 1/300 Ag | 0.68 | 9.50 | 0.49 | 3.15 |
|  | 0.68 | 10.3 | 0.46 | 3.21 |

Figure 16:
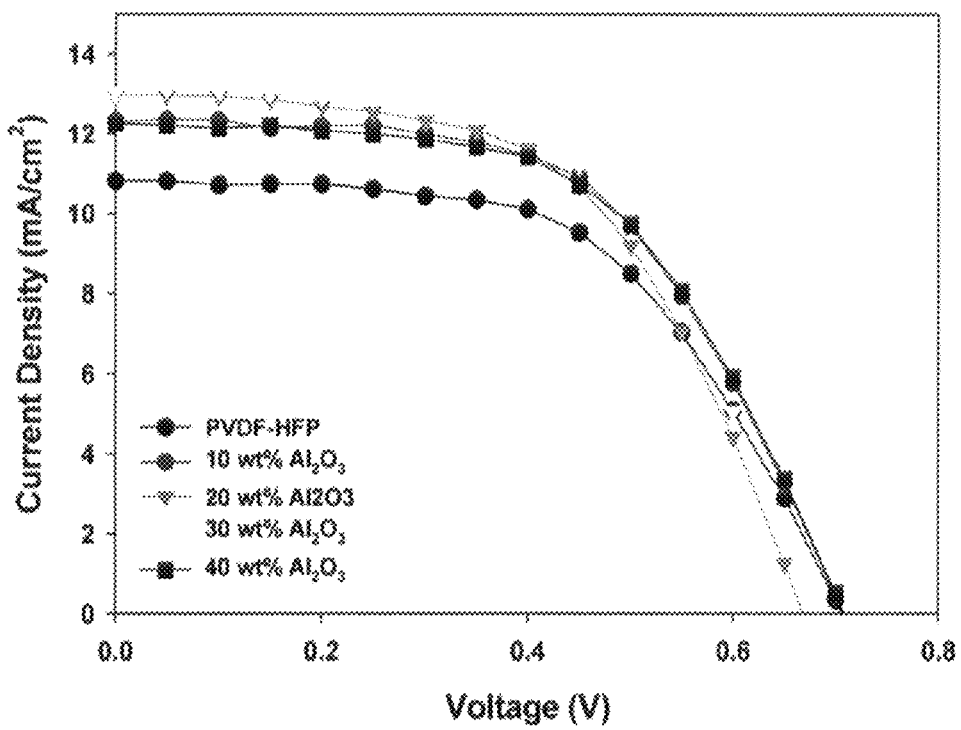
FIG. 16 is a graph of the voltage-current density of the dye-sensitized solar cell device, which uses fibers containing inorganic nanofillers $Al_2O_3$ and PVDF-HFP fiber having a nanoscale diameter and prepared according to the working examples of the present invention at 100 $mW/cm^2$ illumination.

FIG. 16 is a graph showing the voltage-current density of the dye-sensitized solar cell device at the state of illumination of 100 mW/cm$^2$ using the PVDF-HFP fiber having the diameter in nanoscale fabricated following example 11, wherein PVDF-HFP contain Al$_2$O$_3$ as the inorganic nanofiller.

Table 3 shows the property of the dye-sensitized solar cell device made by adding inorganic nanofiller-containing PVDF-HFP polymer nanofiber fabricated at the condition that supplied voltage is between 12 kV and 15 kV, the gap between the tip and the collector is between 15 cm and 18 cm, and the solution supply velocity is 1.5 ml/h, and the wt % of Al$_2$O$_3$ as the inorganic nanofiller relative to the polymer is changing.

According to FIG. 16 and Table 3, the short circuit current has maximum value when the content of Al$_2$O$_3$ added to PVDF-HFP is 20 and 30 wt %, and the efficiency of conversion of the energy has maximum value in case of 30 wt %.

Figure 17:
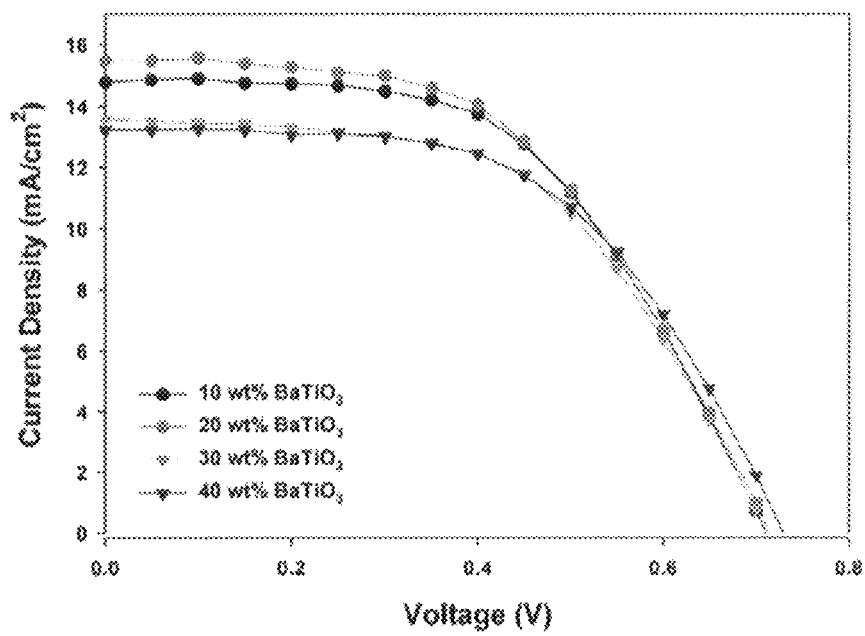
FIG. 17 is a graph of the voltage-current density of the dye-sensitized solar cell device, which uses fibers containing inorganic nanofillers $BaTiO_3$ and PVDF-HFP fiber having a nanoscale diameter and prepared according to the working examples of the present invention at 100 $mW/cm^2$ illumination.

FIG. 17 is a graph showing the voltage-current density of the dye-sensitized solar cell device at the state of illumination of 100 mW/cm$^2$ using the PVDF-HFP fiber having the diameter in nanoscale fabricated following example 11, wherein PVDF-HFP contain BaTiO$_3$ as the inorganic nanofiller.

TABLE 3

Comparison of photovoltaic performances of the dye-sensitized solar cell device using PVDF-HFP polymer nanofiber, wherein PVDF-HFP contains Al$_2$O$_3$ as the inorganic nanofiller

| Al$_2$O$_3$ wt % | Open circuit Voltage (V) | Current density (mA/cm$^2$) | Fill Factor | Energy Conversion Efficiency (%) |
|---|---|---|---|---|
| 0 | 0.71 | 10.8 | 0.56 | 4.28 |
| 10 | 0.71 | 12.3 | 0.57 | 4.91 |
| 20 | 0.67 | 13.0 | 0.56 | 4.80 |
| 30 | 0.67 | 13.0 | 0.57 | 5.05 |

Table 4 shows the property of the dye-sensitized solar cell device made at the same condition as that in Table 3 without using BaTiO$_3$ instead of Al$_2$O$_3$.

According to FIG. 17 and Table 4, the current density and the efficiency of conversion of the energy have maximum value when the content of BaTiO$_3$ added to PVDF-HFP is 20 wt %.

TABLE 4

Comparison of photovoltaic performances of the dye-sensitized solar cell device using PVDF-HFP polymer nanofiber, wherein PVDF-HFP contains BaTiO$_3$ as the inorganic nanofiller

| BaTiO$_3$ wt % | Open circuit Voltage (V) | Current density (mA/cm$^2$) | Fill Factor | Energy Conversion Efficiency (%) |
|---|---|---|---|---|
| 0 | 0.71 | 10.8 | 0.56 | 4.28 |
| 10 | 0.71 | 14.5 | 0.54 | 5.59 |
| 20 | 0.72 | 15.5 | 0.52 | 5.78 |
| 30 | 0.71 | 13.8 | 0.55 | 5.30 |

According to Tables 2 to 4, the current density and the efficiency of conversion of the energy was more improved when inserting the fiber containing Ag, or Al$_2$O$_3$ or BaTiO$_3$ as the inorganic nanofiller to the dye-sensitized solar cell, and melting it in the electrolyte compared to the dye-sensitized solar cell having the fiber which is not containing such components.

Figure 18:
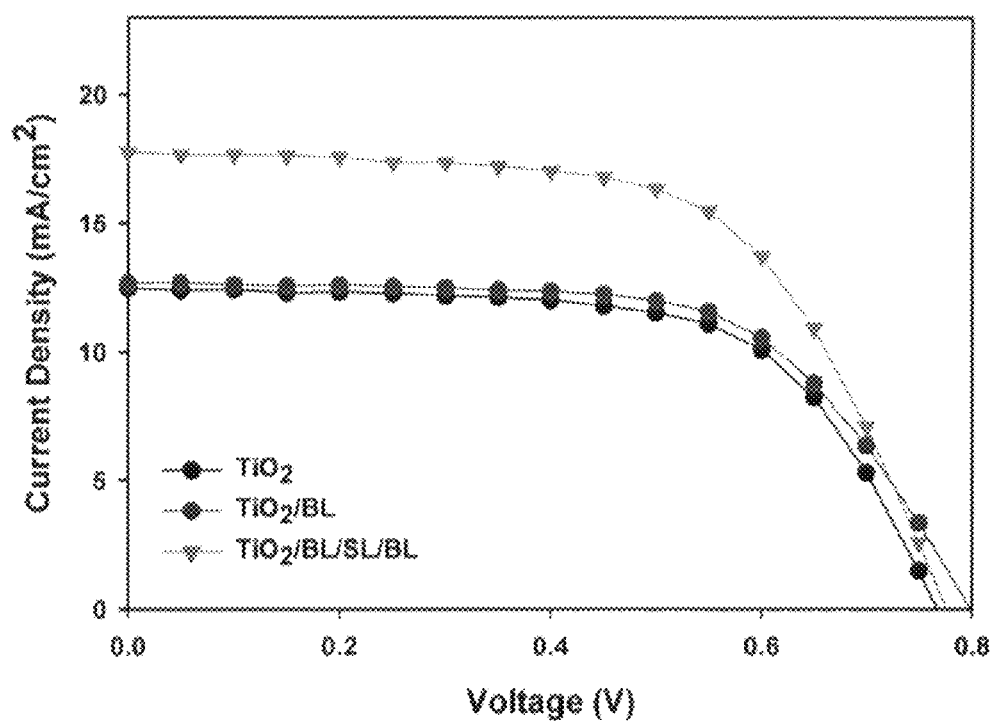
FIG. 18 is a graph of the voltage-current density of the dye-sensitized solar cell device, which uses PVA fibers having a nanoscale diameter and prepared according to the working examples of the present invention at 100 $mW/cm^2$ illumination.

FIG. 18 is a graph showing the voltage-current density of the dye-sensitized solar cell device at the state of illumination of 100 mW/cm$^2$ using the PVA fiber having the diameter in nanoscale fabricated following example 12. According to FIG. 18, it can be also identified that the voltage is increased as introducing the interface bonding layer and the scattering layer.

Figure 19:
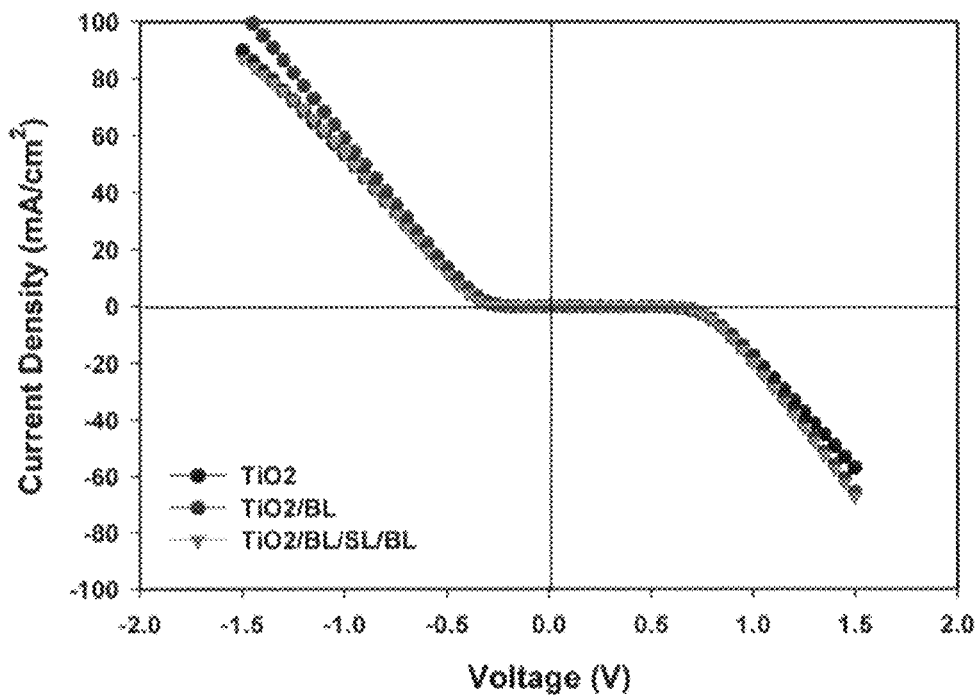
FIG. 19 is a graph of the voltage-current density of the dye-sensitized solar cell device, which uses PVA fibers having a nanoscale diameter and prepared according to the working examples of the present invention in the dark condition.

FIG. 19 is a graph showing the voltage-current density of the dye-sensitized solar cell device at the dark state using the PVA fiber having the diameter in nanoscale fabricated following example 12. It is identified that the voltage is increased as introducing the interface bonding layer and the scattering layer, since the two layers prevent the recombination of TiO$_2$ layer and electrode layer.

Table 5 shows the property of the dye-sensitized solar cell device made by adding PVA polymer fiber fabricated at the condition that supplied voltage is 20 kV, the gap between the tip and the collector is 20 cm, and the solution supply velocity is 0.6 ml/h, and the wt % of the polymer is changing. According to Table 5, the current density was increased significantly as introducing the interface bonding layer and the scattering layer, while the open circuit voltage and Fill Factor were not greatly varied. Therefore, when the efficiency of conversion of the total energy was identified, the dye-sensitized solar cell having high efficiency of 7.36% could be manufactured.

TABLE 5

Comparison of photovoltaic performances of the dye-sensitized solar cell device using PVA polymer nanofiber in the inorganic oxide layer introduced with the interface bonding layer and the scattering layer

| | Open circuit Voltage (V) | Current density (mA/cm$^2$) | Fill Factor | Energy Conversion Efficiency (%) |
|---|---|---|---|---|
| TiO$_2$ | 0.767 | 12.5 | 0.638 | 6.11 |
| TiO$_2$/BL | 0.799 | 12.7 | 0.629 | 6.36 |
| TiO$_2$/BL/SL/BL | 0.792 | 16.1 | 0.577 | 7.36 |

Figure 20:
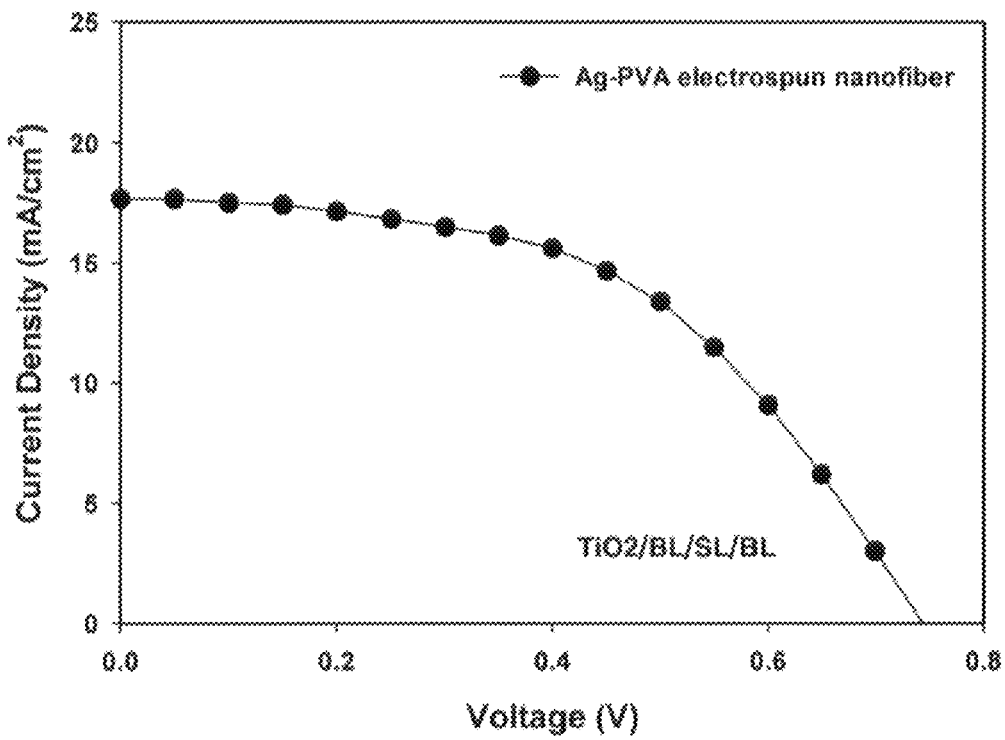
FIG. 20 is a graph of the voltage-current density of the dye-sensitized solar cell device, which uses PVA fibers containing Ag and having a nanoscale diameter and prepared according to the working examples of the present invention at 100 $mW/cm^2$ illumination.

FIG. 20 is a graph showing the voltage-current density of the dye-sensitized solar cell device at the state of illumination of 100 mW/cm$^2$ using the PVA fiber having the diameter in nanoscale fabricated following example 13, wherein PVA contains Ag.

Table 6 shows the property of the dye-sensitized solar cell device made by adding Ag-PVA fiber fabricated at the same condition as fabricating PVA. According to Table 6, the efficiency of conversion of the energy was improved to 8.12% by adding Ag to PVA fiber.

TABLE 6

Comparison of photovoltaic performances of the dye-sensitized solar cell device using polymer nanofiber in the inorganic oxide layer introduced with the interface bonding layer and the scattering layer (Ag-PVA)

| | Open circuit Voltage (V) | Current density (mA/cm$^2$) | Fill Factor | Energy Conversion Efficiency (%) |
|---|---|---|---|---|
| TiO$_2$/BL/SL/BL | 0.789 | 17.09 | 0.601 | 8.12 |

In the experiment of using PVA fiber, the current density was more improved when inserting the Ag-containing fiber to the dye-sensitized solar cell, and melting it in the electrolyte (Table 6) compared to the dye-sensitized solar cell having the fiber which is not containing Ag (Table 5). It is the result that Ag functions as a medium helping the moving of ions in the electrolyte, thereby the conductivity rate of ions among TiO$_2$, the electrolyte, and Pt electrode was increased.

Table 7 shows the property of the dye-sensitized solar cell device made by adding the blended polymer fiber of PVDF-HFP and polystyrene fabricated at the condition that supplied voltage is 20 kV, the gap between the tip and the collector is 21 cm, and the solution supply velocity is 5.0 ml/h, and the blended polymer fiber of PVDF-HFP and PMMA fabricated at the condition that supplied voltage is 20 kV, the gap between the tip and the collector is 20 cm, and the solution supply velocity is 4.0 ml/h.

TABLE 7

Comparison of photovoltaic performances of the dye-sensitized solar cell device using the blended polymer PVDF-HFP with polystyrene and PMMA, respectively

| | Open circuit Voltage (V) | Current density (mA/cm$^2$) | Fill Factor | Energy Conversion Efficiency (%) |
|---|---|---|---|---|
| PVDF-PS | 0.70 | 12.10 | 0.59 | 5.02 |
| PVDF-PMMA | 0.69 | 12.10 | 0.60 | 5.03 |

Example 26

Measuring the Impedance of the Dye-Sensitized Solar Cell Device

The resistance at each interface was measured by measuring the impedance of the dye-sensitized solar cell device manufactured following example 15. FIGS. 21 to 27 are graphs showing the data of the impedance obtained from measuring the value with Echem Analyst (GAMRY) and fitting to the Z-MAN software.

Figure 21:
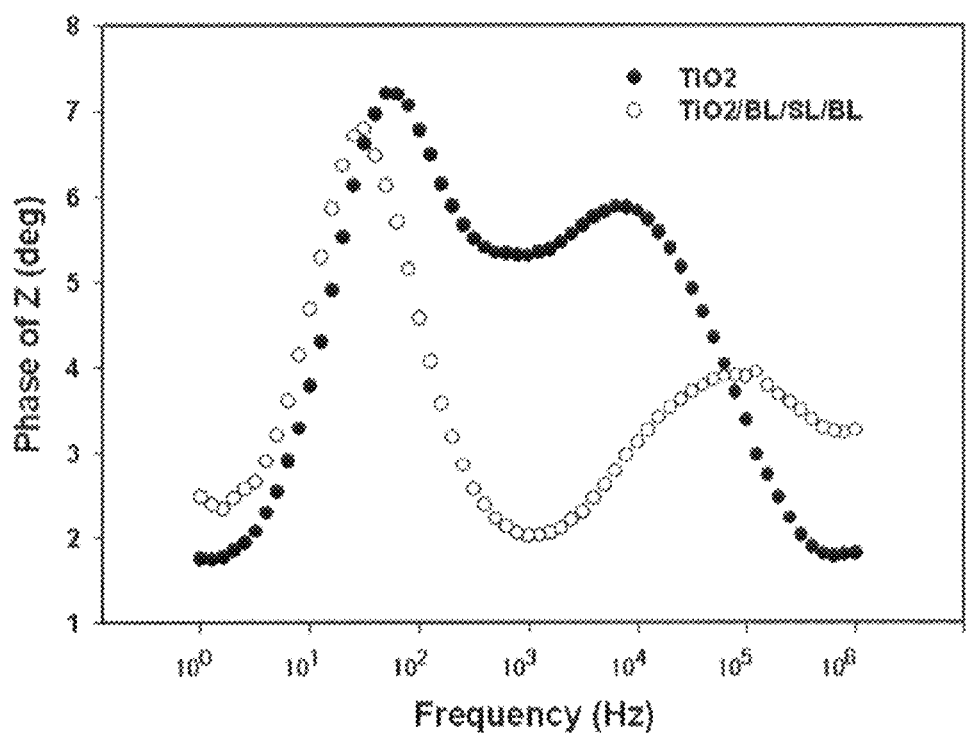
FIG. 21 illustrates a comparison of the Bode graphs of impedance of the dye-sensitized solar cell device, which uses PVDF-HFP fibers having nanoscale diameter and prepared by the working examples of the present invention, and the dye-sensitized solar cell device including a light scattering layer and an interface bonding layer.

FIG. 21 is a the bode graph of impedance of the dye-sensitized solar cell device which has the interface bonding layer and the light scattering layer introduced in the inorganic oxide layer, and the device which does not have the two layers. When the peak of the graph is placed at closer position to the low frequency, an electron charge moves faster and the life time of an electron is longer. Fast movement of the electric charge is induced by introducing the interface bonding layer and the light scattering layer so that the high current density and efficiency of conversion of the energy are provided, since the peak of the graph is more shifted to near the low frequency when the interface bonding layer and the light scattering layer were introduced.

Tables 8 and 9 show the results of measuring the resistance of the dye-sensitized solar cell device made with PVDF-HFP and PVA nanofiber by electrospinning method, and made with the polymer film by spin-coating method, respectively, after introducing the interface bonding layer and the light scattering layer in the inorganic oxide layer. Rs is the series of resistance of the solar cell device, $R1_{CT}$ is the resistance between the inorganic oxide layer (1003) containing the interface bonding layer I (1004) and the light scattering layer (1005), $R2_{CT}$ is the resistance between the light scattering layer (1005) containing the interface bonding layer II (1006) and the polymer electrolyte layer (1008), and $R3_{CT}$ is the resistance between the polymer electrolyte layer (1008) and the second electrode (1009). There are no significant differences among $R1_{CT}$, $R2_{CT}$, and $R3_{CT}$, however, according to the value of $R2_{CT}$, the resistance of the dye-sensitized solar cell device made with polymer nanofiber was lower. Therefore, high current density as the photovoltaic performance is obtained due to low resistance between the light scattering layer and the electrolyte layer.

Figure 22:
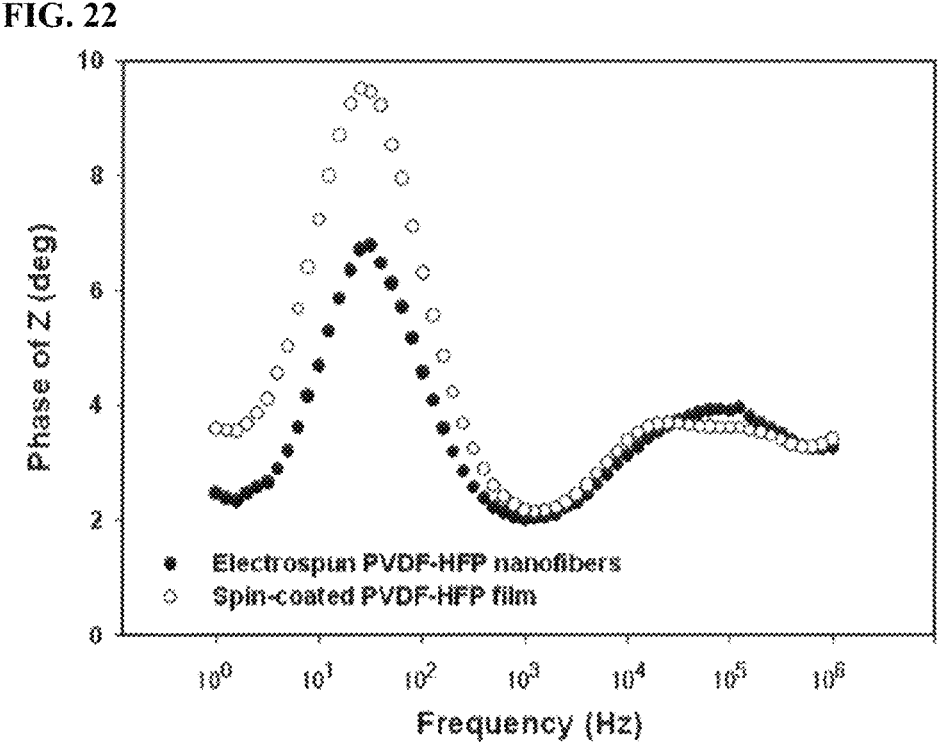
FIG. 22 illustrates a comparison of the Bode graphs of impedance of the dye-sensitized solar cell device, which uses PVDF-HFP fibers having nanoscale diameter and prepared by the working examples of the present invention, and PVDF-HFP films.
Figure 23:
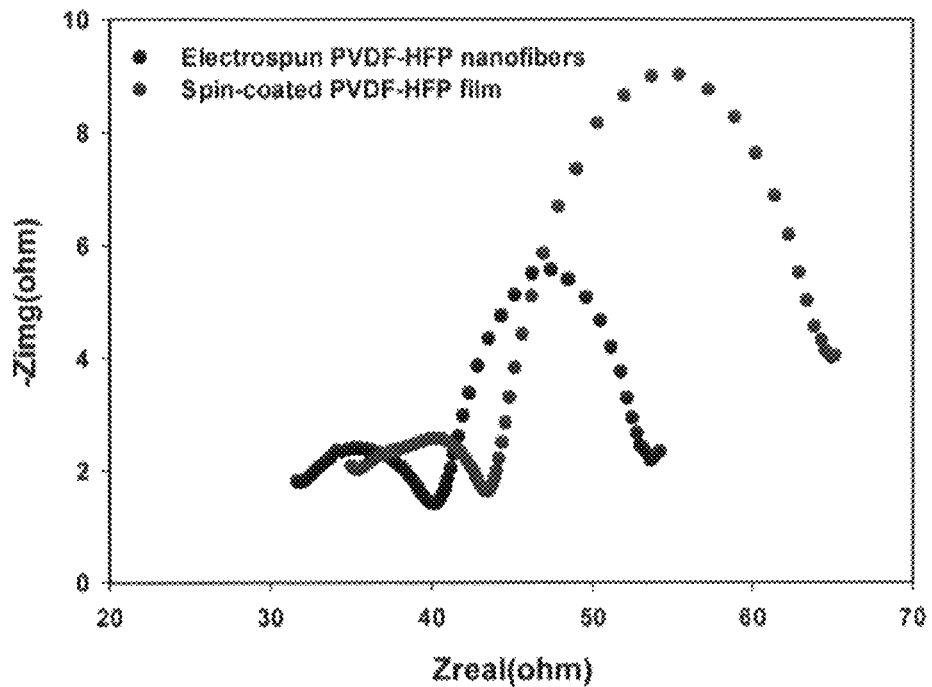
FIG. 23 illustrates a comparison of the Nyquist graphs of impedance of the dye-sensitized solar cell device, which uses PVDF-HFP fibers having nanoscale diameter and prepared by the working examples of the present invention, and PVDF-HFP films fabricated by a spin coating method.
Figure 24:
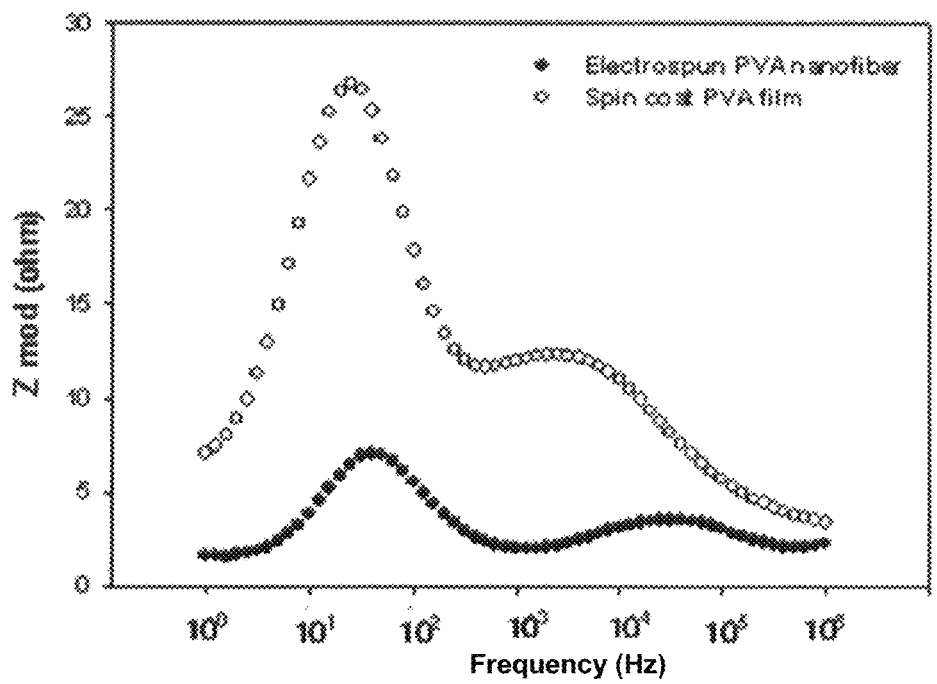
FIG. 24 illustrates a comparison of the Bode graphs of impedance of the dye-sensitized solar cell device, which uses PVA fibers having nanoscale diameter and prepared by the working examples of the present invention, and PVA films fabricated by a spin coating method.
Figure 25:
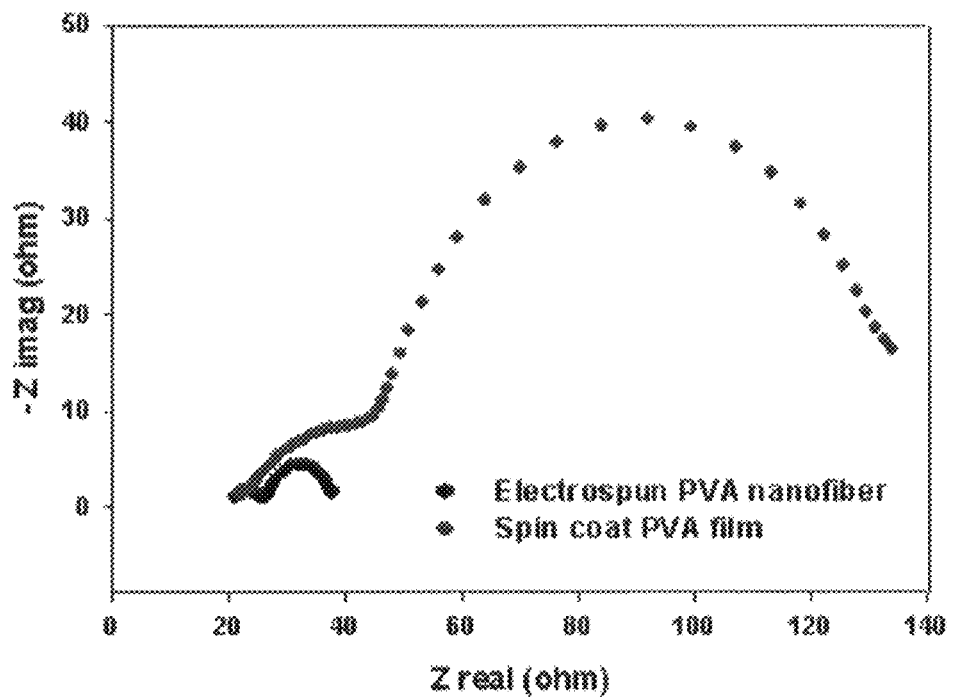
FIG. 25 illustrates a comparison of the Nyquist graphs of impedance of the dye-sensitized solar cell device, which uses PVA fibers having nanoscale diameter and prepared by the working examples of the present invention, and PVA films fabricated by a spin coating method.

FIGS. 22 and 24 are the bode graphs of impedance, and FIGS. 23 and 25 are Nyquist graphs. Because the peaks of the Bode graphs are placed at the same frequency in the low frequency region, there are no significant differences in movement of the electric charge. A bigger and higher half-circle of the graph means that there are lots of recombination of an electron and a doped hole. When the polymer film is used by spin-coating method, the half-circle of the graph in the high frequency region is bigger, thereby recombination is more created. Therefore, high and low resistance as the photovoltaic performance is obtained.

Figure 26:
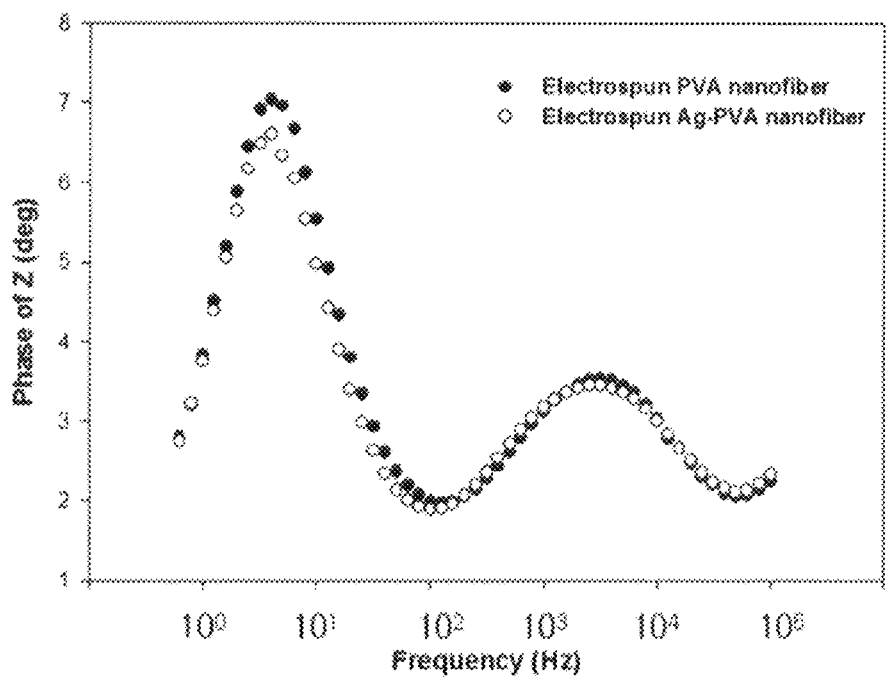
FIG. 26 illustrates a comparison of the Bode graphs of impedance of the dye-sensitized solar cell device, which uses PVA fibers having nanoscale diameter and prepared by the working examples of the present invention, and PVA films containing silver.
Figure 27:
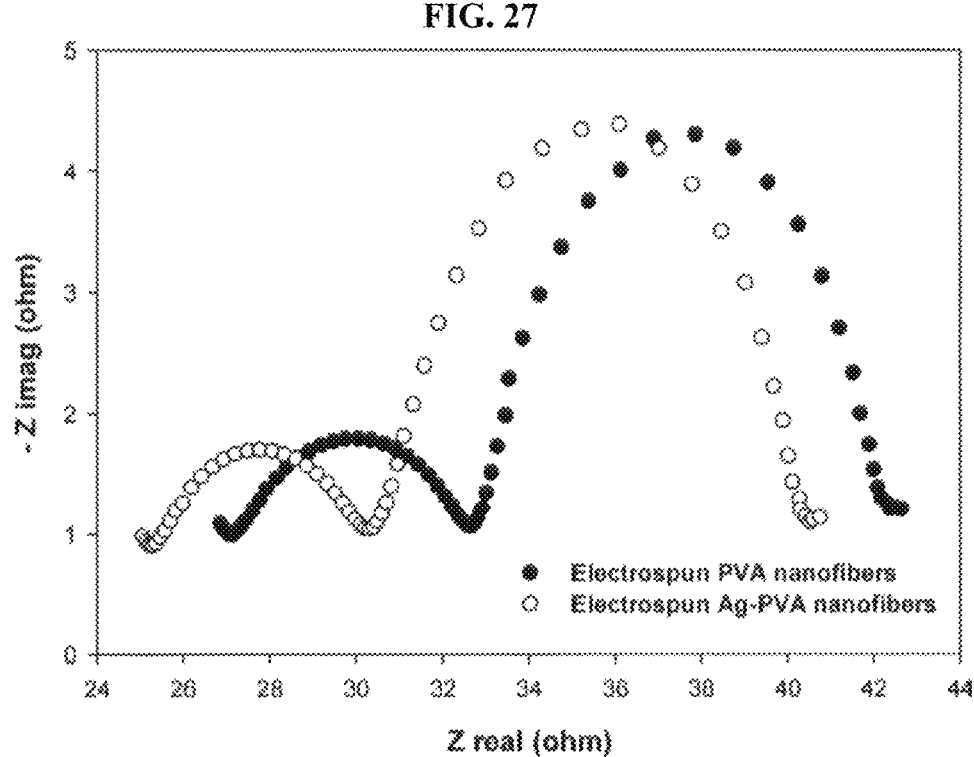
FIG. 27 illustrates a comparison of the Nyquist graphs of impedance of the dye-sensitized solar cell device, which uses PVA fibers having nanoscale diameter and prepared by the working examples of the present invention, and PVA films containing silver.

FIG. 26 is a comparison of the bode graphs of impedance of the dye-sensitized solar cell device made with Ag-containing PVA fiber having the diameter in nanoscale following examples. Because the peaks of the two graphs are placed at the same frequency, there are no significant differences in movement of the electric charge. FIG. 27 is a comparison of the nyquist graphs of impedance of the dye-sensitized solar cell device made with Ag-containing PVA fiber having the diameter in nanoscale following examples. Because the curves of the two graphs showed similar patterns, however, the interface resistance of PVA was smaller than that of Ag-PVA, and generally, low resistance was exhibited.

TABLE 8

Resistance level from the measurement of the impedance of the dye-sensitized solar cell device made with PVDF-HFP nanofiber by electrospinning method, and made with PVDF-HFP polymer film by spin-coating method

|  | Rs (Ω) | $R1_{CT}$ (Ω) | $R2_{CT}$ (Ω) | $R3_{CT}$ (Ω) |
| --- | --- | --- | --- | --- |
| Electrospinning method | 32.203 | 12.305 | 3.608 | 5.117 |
| Spin-coating method | 36.540 | 11.856 | 10.437 | 6.776 |

TABLE 9

Resistance level from the measurement of the impedance of the dye-sensitized solar cell device made with PVA nanofiber by electrospinning method, and made with PVA polymer film by spin-coating method

|  | Rs (Ω) | $R1_{CT}$ (Ω) | $R2_{CT}$ (Ω) | $R3_{CT}$ (Ω) |
| --- | --- | --- | --- | --- |
| PVA fiber | 25.643 | 4.606 | 11.825 | 9.811 |
| Ag PVA fiber | 27.089 | 2.793 | 3.077 | 9.233 |
| Spin-coated film | 21.825 | 73.393 | 24.466 | 33.720 |

As mentioned above, the dye-sensitized solar cell made by utilizing Ag-containing fiber had increased current density due to increasing conductivity of ion between interfaces. It can be verified from the analysis of the impedance. There are no significant differences among the series of resistance of the solar cell device, however, the value of $R1_{CT}$, $R2_{CT}$, and $R3_{CT}$ of the solar cell made with Ag-containing nanofiber were lowered. Thus, it is found that the resistance between interfaces of the solar cell made with Ag-containing nanofiber is lower.

Figure 28:
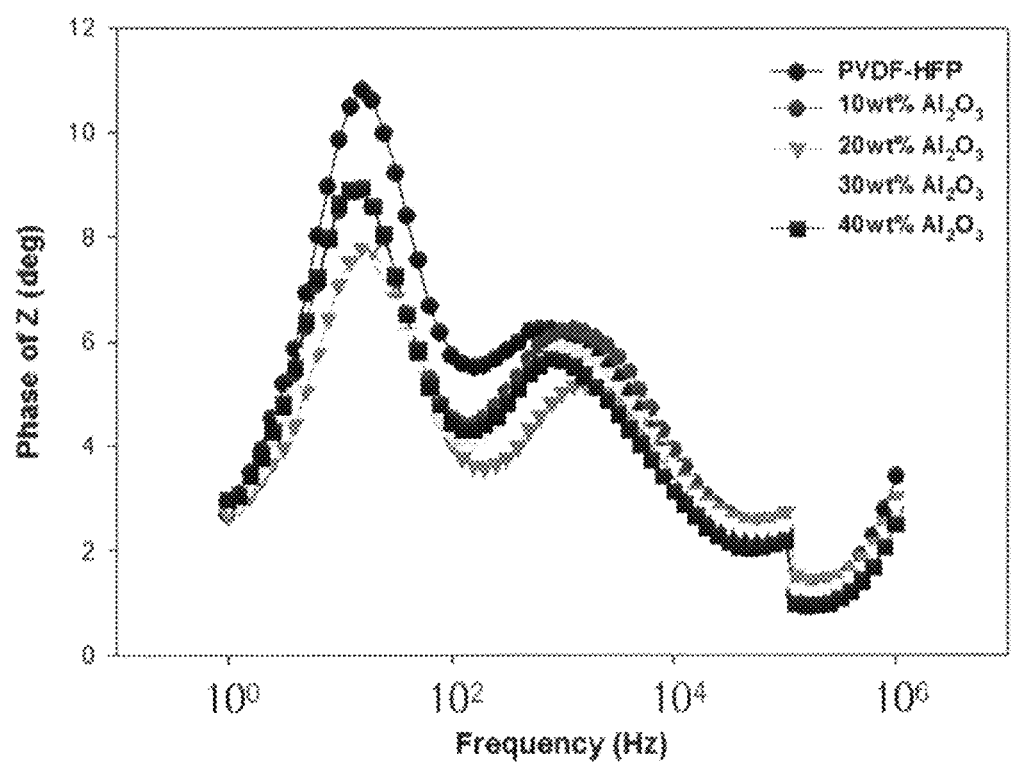
FIG. 28 illustrates a comparison of the Bode graphs of impedance of the dye-sensitized solar cell device, which uses PVDF fibers containing an organic nanofiller $Al_2O_3$, having nanoscale diameter and prepared by the working examples of the present invention.
Figure 29:
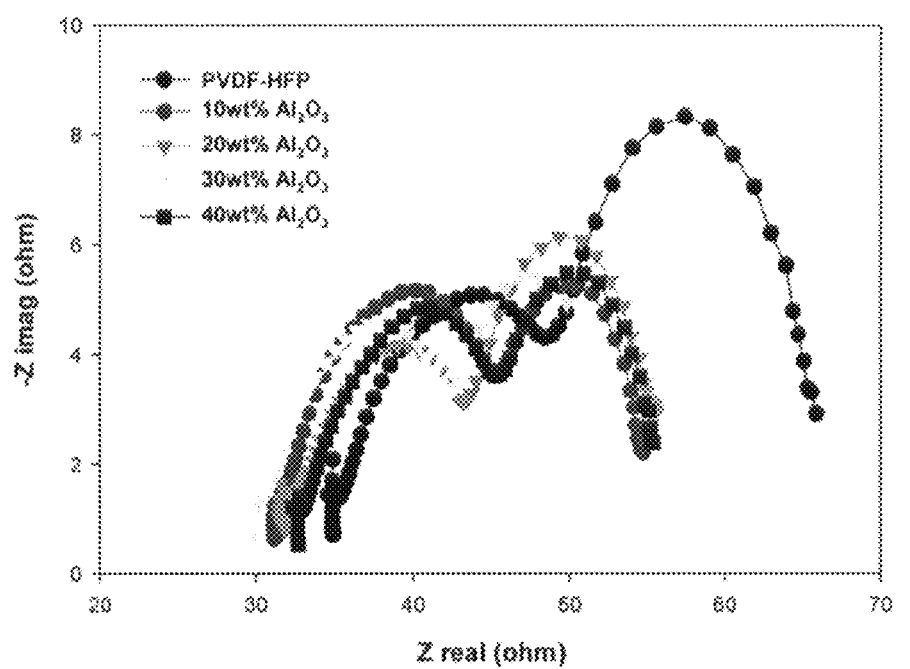
FIG. 29 illustrates a comparison of the Nyquist graphs of impedance of the dye-sensitized solar cell device, which uses PVDF fibers containing an organic nanofiller $Al_2O_3$, having nanoscale diameter and prepared by the working examples of the present invention.

FIG. 28 is a comparison of the bode graphs of impedance of the dye-sensitized solar cell device made with PVDF fiber having the diameter in nanoscale following examples, wherein PVDF contains $Al_2O_3$ as the inorganic nanofiller. Because the peaks of the two graphs are placed at the similar frequency, there are no significant differences in movement of the electric charge. FIG. 29 is a comparison of the nyquist graphs of impedance of the dye-sensitized solar cell device made with PVDF fiber having the diameter in nanoscale following examples, wherein PVDF contains $Al_2O_3$ as the inorganic nanofiller. The graph of PVDF-HFP fiber containing the inorganic nanofiller, $Al_2O_3$, has smaller half-circle than that of the fiber which does not contain the same, thereby introducing the inorganic nanofiller, $Al_2O_3$ is identified that it prevents recombination.

TABLE 10

Resistance level from the measurement of the impedance of the dye-sensitized solar cell device made with PVDF-HFP nanofiber by electrospinning method, wherein PVDF contains $Al_2O_3$ as the inorganic nanofiller

|  | PVDF-HFP | 10 wt % | 20 wt % | 30 wt % | 40 wt % |
| --- | --- | --- | --- | --- | --- |
| Rs | 34.453 | 30.793 | 31.195 | 29.514 | 32.453 |
| R1 | 16.658 | 16.386 | 14.379 | 14.748 | 16.658 |
| R2 | 15.479 | 8.480 | 11.173 | 9.465 | 9.174 |

Example 27

Test the Electrolyte Durability of PVDF-HFP Polymer Nanofiber Made by Electrospinning Method The polymer fibers are prepared by the electrospinning of PVDF-HFP, then produced polymer fibers are introduced between the glass substrates and the electrolytes are also introduced. The durability test is conducted. (A) in FIG. 30 is an image after the glass substrates are bonded without introducing polymer fibers then only the electrolytes are introduced. (A-1) in FIG. 30 is an image after the fibers are introduced and the glass substrates are bonded then the electrolytes are introduced. After boring a hole having 1 mm of diameter through the glass substrate, the electrolytes are introduced through the hole then, observed for 48 hours without filling in the hole.

(B) in FIG. 30 is an image at 12 hrs after the glass substrates are bonded then only the electrolytes are introduced. (B-1) in FIG. 30 is an image at 12 hrs after the fibers are introduced and the glass substrates are bonded then the electrolytes are introduced.

(C) in FIG. 30 is an image at 36 hrs after the glass substrates are bonded then only the electrolytes are introduced. (C-1) in FIG. 30 is an image at 36 hrs after the fibers are introduced and the glass substrates are bonded then the electrolytes are introduced.

(D) in FIG. 30 is an image at 48 hrs after the glass substrates are bonded then only the electrolytes are introduced. (D-1) in FIG. 30 is an image at 48 hrs after the fibers are introduced and the glass substrates are bonded then the electrolytes are introduced. Upon comparing them after 48 hours, the amount of electrolytes of (D) in FIG. 30 which only eletrolytes are introduced become less by evaporation, while the electrolytes of (D) in FIG. 30 which the fibers and eletrolytes are introduced are barely evaporated and retained in the glass substrate. It shows that the polymer nanofiber can retain the electrolytes stably in the glass substrates. (E) in FIG. 30 is a picture that the glass substrates are removed due to check if the fibers are retained in the electrolytes after 48 hours. It is understood that the fiber retained without melting or dispersing, although 48 hours are lapsed.

Comparative Example 1

Photovoltaic Performances of the Dye-Sensitized Solar Cells Using the Spin Coated PVDF-HFP Polymer as a Electrolyte Matrix The polymer film is prepared by spin-coating method using the polymer PVDF-HFP then, the produced film is introduced into the dye-sensitized solar cells, following by determinating the photovoltaic performance of the device.

Electrolytes solution is prepared to make the dye-sensitized solar cells according to the same progress and condition to the examples excepting using the polymer film by spin-coating method instead of polymer nanofiber. Regarding to the dye-sensitized solar cells comprising the polymer film by the spin-coating method, the current density was determined according to the voltage in the same condition as Example 25. The determination of voltage-current density of the dye-sensitized solar cells according to Comparative Example 1 is shown in FIG. 31, Table 11 indicated the open circuit voltage, short circuit current, Fill facter, energy conversion efficiency.

In the dye-sensitized solar cells according to Comparative Example 1, the open circuit votage which is determined by bandgap energy difference of the electrodes, is similar to that of Example 9 in which the polymer nanofibers are included. However, in the case of the devices comprising the typical polymer fiber, the value of the short circuit current was lower. It seems because the ion mobility is higher due to lots of pores in polymer nanofiber. Also, the energy conversion efficiency of Comparative Example 1 is tend to be lower compared to the device comprising the polymer nanofiber.

TABLE 11

Photovoltaic performances of the dye-sensitized solar cells using the spin coated PVDF-HFP polymer as a electrolyte matrix

| Open Curcuit Voltage (V) | Current Density (mA/cm2) | Fill Factor | Energy Conversion Efficiency (%) |
|---|---|---|---|
| 0.769 | 6.79 | 0.611 | 3.20 |

Comparative Example 2

Photovoltaic Performances of the Dye-Sensitized Solar Cells using the Spin Coated PVA Polymer as a Electrolyte Matrix The polymer film is prepared by spin-coating method using the PVA polymer used in Example 6 then, the produced film is introduced into the dye-sensitized solar cells, following by determinating the photovoltaic performance of the device.

Electrolytes solution is prepared to make the dye-sensitized solar cells according to the same progress and condition to the examples excepting using the polymer film by spin-coating method instead of polymer nanofiber. Regarding to the dye-sensitized solar cells comprising the polymer film by the spin-coating method, the current density was determined according to the voltage in the same condition as Example 25. The determination of voltage-current density of the dye-sensitized solar cells according to Comparative Example 2 is shown in FIG. 32, Table 12 indicated the open circuit voltage, short circuit current, Fill facter, energy conversion efficiency.

In the dye-sensitized solar cells according to Comparative Example 2, the open circuit voltage which is determined by bandgap energy difference of the electrodes, is similar to that of Example 15 in which the polymer nanofibers are included. However, in the case of the devices comprising the typical polymer fiber, the value of the short circuit current was lower. It seems because the ion mobility is higher due to lots of pores in polymer nanofiber. Also, the energy conversion efficiency of Comparative Example 2 is tend to be lower compared to the device comprising the polymer nanofiber.

TABLE 12

Photovoltaic performances of the dye-sensitized solar cells using the spin coated PVA polymer as a electrolyte matrix

| Open Curcuit Voltage (V) | Current Density (mA/cm$^2$) | Fill Factor | Energy Conversion Efficiency (%) |
|---|---|---|---|
| 0.749 | 3.24 | 0.537 | 1.37 |

Comparative Example 3

Photovoltaic Performances of the Dye-Sensitized Solar Cells using Liquid Electrolytes The dye-sensitized solar cells are prepared in which only the liquid electrolytes are introduced to find and compare the energy conversion efficiency of the dye-sensitized solar cells without the polymer fibers.

The current density is determined according to the voltage determined in the same condition as Example 25. The determination of voltage-current density of the dye-sensitized solar cells according to Comparative Example 3 is shown in FIG. 33, and Table 13 shows the open circuit voltage, short circuit current, Fill factor, energy conversion efficiency.

Table 14 shows the impedance value according to Comparative Example 3. According to Table 14, overall impedance value is reduced. Thus it is understood that when using only electrolytes without the nanofibers, overall resistance is reduced, since when nanofibers are introduced, the inner resistance is increased due to the nanofibers.

TABLE 13

Photovoltaic performances of the dye-sensitized solar cells using liquid electrolytes

| Open Curcuit Voltage (V) | Current Density (mA/cm$^2$) | Fill Factor | Energy Conversion Efficiency (%) |
|---|---|---|---|
| 0.745 | 17.67 | 0.508 | 6.69 |

TABLE 14

Determination of the impedance of the dye-sensitized solar cells using liquid electrolytes

| Rs (Ω) | R1CT (Ω) | R2CT (Ω) | R3CT (Ω) |
|---|---|---|---|
| 21.472 | 2.213 | 9.483 | 3.549 |

Preferable examples are described which are only exemplary and various modification and variation of the present invention may be practiced. However, it is evident that such modification and variation are included in the scope of the present invention without departing from the spirit by the attached claims of the present invention.

The invention claimed is:
1. A dye-sensitized solar cell, comprising:
a first substrate and a second substrate arranged to face each other;
a first electrode interposed between the first and second substrates, wherein the first electrode comprises an inorganic oxide layer and a dye layer chemically absorbed into the inorganic oxide layer to provide excited electrons;
a second electrode disposed opposite to the first electrode, wherein the second electrode is interposed between the first and second substrates to thereby allow an electric current to flow;
a first interface bonding layer configured to facilitate the interface bonding to the inorganic oxide layer, wherein the first interface bonding layer is disposed on the inorganic oxide layer;
a second interface bonding layer configured to prevent an inverse current, wherein the second interface bonding layer is disposed on the first interface bonding layer;
a light scattering layer interposed between the first and second interface bonding layers, said light scattering layer increasing optical absorption; and
solid electrolytes interposed between the first and second electrodes, wherein the solid electrolytes comprise polymer nanofibers fabricated by an electrospinning method and provide electrons to the dye layer by an oxidation-reduction reaction;

wherein the first and the second interface bonding layer are each independently formed from inorganic oxides in the form of nanoparticles having an average diameter between 1 and 50 nm; and wherein the light scattering layer is formed from inorganic oxides in the form of nanoparticles having an average diameter between 100 and 500 nm.

2. The dye-sensitized solar cell of claim 1, wherein the polymer fiber is at least one polymer selected from the group consisting of polyvinylidenefluoro-hexafluoropropylene (PVDF-HFP), polyethylene oxide (PEO), polyacrylonitrile (PAN), polymethyl methacrylate (PMMA), polyvinylalcohol (PVA), and polymer blend thereof.

3. The dye-sensitized solar cell of claim 1, wherein the content of the polymer is from 5 to 95 percent by weight relative to the solid electrolytes.

4. The dye-sensitized solar cell of claim 1, wherein the weight average molecular weight of the polymer is from 50,000 to 1,000,000.

5. The dye-sensitized solar cell of claim 1, wherein the polymer fiber has a diameter of from 20 to 1500 nm.

6. The dye-sensitized solar cell of claim 1, wherein said solid electrolytes comprise nano-sized Ag.

7. The dye-sensitized solar cell of claim 1, wherein said solid electrolytes further comprise inorganic nanofillers.

8. The dye-sensitized solar cell of claim 7, wherein said inorganic nanofillers are $Al_2O_3$ or $BaTiO_3$.

9. The dye-sensitized solar cell of claim 1, wherein the thicknesses of the first and second interface bonding layers are from 10 to 100 nm.

10. The dye-sensitized solar cell of claim 1, wherein the dye layer is at least one dye selected from the group consisting of ruthenium based dyes, xanthen based dyes, cyanine based dyes, phorphyrin based dyes, and anthraquinone based dyes.

11. A method of preparing a dye-sensitized solar cell, comprising:
    preparing a first substrate;
    forming an inorganic oxide layer on one surface of the first substrate and forming a first electrode;
    forming a first interface bonding layer facilitating the interface bonding to the inorganic oxide layer on the inorganic oxide layer;
    forming a light scattering layer on the first interface bonding layer to increase light absorption;
    forming a second interface bonding layer on the light scattering layer to prevent an inverse current;
    absorbing a dye layer on the second interface bonding layer;
    forming polymer nanofibers by electrospinning a polymer solution with an electrospinning device on the second interface bonding layer to which the dye layer is absorbed, applying an electrolyte solution to the polymeric nanofibers and then evaporating the applied solution to form solid electrolytes; and
    forming a second electrode and a second substrate on the solid electrolytes;

wherein the first and the second interface bonding layer are each independently formed from inorganic oxides in the form of nanoparticles having an average diameter between 1 and 50 nm; and wherein the light scattering layer is formed from inorganic oxides in the form of nanoparticles having an average diameter between 100 and 500 nm.

12. The process of claim 11, wherein the step of forming the solid electrolytes comprises dissolving a polymer in a solvent to form a polymer solution, introducing the formed polymer solution into an electrospinner and spinning the polymer solution.

13. The process of claim 11, wherein said polymer solution comprises nano-sized Ag.

14. The process of claim 11, wherein said polymer solution further comprises inorganic nanofillers.

15. The process of claim 11, wherein the polymer nanofibers are formed with an electrospinning device comprising: a voltage supplier to apply a voltage to form nanofibers; a solution transporter to regularly spray the polymer solution; an electrospinner to produce polymer nanofibers from the polymer solution transported from the solution transporter by using a voltage applied from the voltage supplier; and a collector to collect the nanofibers spun from the electrospinner.

16. The process of claim 15, wherein the electrospinner controls the gap between a spinning tip and a collector.

17. The process of claim 11, wherein the polymer is at least one polymer selected from the group consisting of polyvinylidenefluoro-hexafluoropropylene (PVDF-HFP), polyethylene oxide (PEO), polyacrylonitrile (PAN), polymethyl methacrylate (PMMA), and polyvinylalcohol (PVA).

18. The process of claim 11, wherein the thicknesses of the first and second interface bonding layers are from 10 to 100 nm.

* * * * *